US012689893B2

(12) United States Patent
Rajadurai et al.

(10) Patent No.: US 12,689,893 B2
(45) Date of Patent: Jul. 21, 2026

(54) APPARATUS AND METHOD FOR COMMUNICATION ESTABLISHMENT IN AUTHENTICATION AND KEY MANAGEMENT FOR APPLICATIONS (AKMA)

(71) Applicant: Samsung Electronics Co., Ltd., Suwon-si (KR)

(72) Inventors: Rajavelsamy Rajadurai, Bangalore (IN); Nivedya Parambath Sasi, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/573,219

(22) PCT Filed: Jul. 28, 2022

(86) PCT No.: PCT/KR2022/011134
§ 371 (c)(1),
(2) Date: Dec. 21, 2023

(87) PCT Pub. No.: WO2023/008929
PCT Pub. Date: Feb. 2, 2023

(65) Prior Publication Data
US 2024/0292212 A1      Aug. 29, 2024

(30) Foreign Application Priority Data

Jul. 28, 2021   (IN) .............................. 202141033834
Jul. 20, 2022   (IN) ........................... 2021 41033834

(51) Int. Cl.
H04W 12/0433       (2021.01)
H04L 5/00       (2006.01)
(Continued)

(52) U.S. Cl.
CPC ....... H04W 12/0433 (2021.01); H04L 5/0053 (2013.01); H04W 12/06 (2013.01); H04W 12/106 (2021.01)

(58) Field of Classification Search
CPC ........... H04W 12/041; H04W 12/0433; H04W 12/06; H04W 12/72; H04W 8/26; H04L 5/0053
See application file for complete search history.

(56) References Cited

U.S. PATENT DOCUMENTS 12,107,950 B2 * 10/2024 De Kievit ............. H04L 9/0838
2022/0377540 A1 * 11/2022 Deng .................... H04L 63/061
(Continued)

FOREIGN PATENT DOCUMENTS

EP        1 932 319 A1      6/2008
WO     2021/093170 A1      5/2021
(Continued)

OTHER PUBLICATIONS

3rd Generation Partnership Project; Technical Specification Group Services and System Aspects; Authentication and Key Management for Applications (AKMA) based on 3GPP credentials in the 5G System (5GS) (Release 17), 3GPP TS 33.535 V17.2.1, Jul. 2, 2021.
(Continued)

*Primary Examiner* — Siu M Lee
(74) *Attorney, Agent, or Firm* — Jefferson IP Law, LLP

(57) ABSTRACT

The disclosure relates to a 5G or 6G communication system for supporting a higher data transmission rate. Embodiments herein provide a system and method for key refresh in Authentication and Key Management for Applications (AKMA). The proposed method is to support $K_{AKMA}$ refresh by requesting the refreshing parameters from the network once the $K_{AF}$ is about to expire. Further, the proposed method is to support $K_{AF}$ refresh by requesting the refresh-
(Continued)

ing parameters from the network once the $K_{AF}$ is about to expire. Further, the proposed method is used to support a mechanism to address the Key synchronisation issue at a User Equipment (UE) side, an Application Function (AF) side and at an AAnF using a key index included as a part of AKMA key identifier (A-KID). Further the proposed method uses certain mechanisms to provide the refresh parameter to the AUSF, the AAnF and the UE as a part of AKMA Refresh procedure or as a part of UPU procedure. Further, the proposed method supports AKMA key refresh with limited impacts on AKMA services in 5G system.

18 Claims, 12 Drawing Sheets

(51) Int. Cl.
  *H04W 12/06* (2021.01)
  *H04W 12/106* (2021.01)

(56) References Cited

U.S. PATENT DOCUMENTS

| | | | | |
|---|---|---|---|---|
| 2023/0413055 A1* | 12/2023 | Peng | | H04W 48/16 |
| 2024/0080662 A1* | 3/2024 | Suh | | H04W 12/037 |
| 2024/0080664 A1* | 3/2024 | Wang | | H04W 12/041 |
| 2024/0080674 A1* | 3/2024 | Long | | H04L 9/0819 |
| 2024/0276217 A1* | 8/2024 | Wang | | H04L 9/0866 |
| 2024/0292212 A1* | 8/2024 | Rajadurai | | H04W 12/06 |

FOREIGN PATENT DOCUMENTS

| | | |
|---|---|---|
| WO | 2021/098115 A1 | 5/2021 |
| WO | 2021/109436 A1 | 6/2021 |

OTHER PUBLICATIONS

Samsung, Support for AKMA Key Refresh Service Operation, C4-211227, 3GPP TSG-CT4 Meeting #102-e, E-Meeting, Feb. 15, 2021.

Samsung, Discussion on Refresh of KAF & KAKMA, S3-212073, 3GPP TSG-SA3 Meeting #103-e, e-meeting, May 10, 2021.

Indian Office Action dated Mar. 9, 2023, issued in Indian Application No. 202141033834.

International Search Report dated Nov. 1, 2022, issued in International Application No. PCT/KR2022/011134.

* cited by examiner

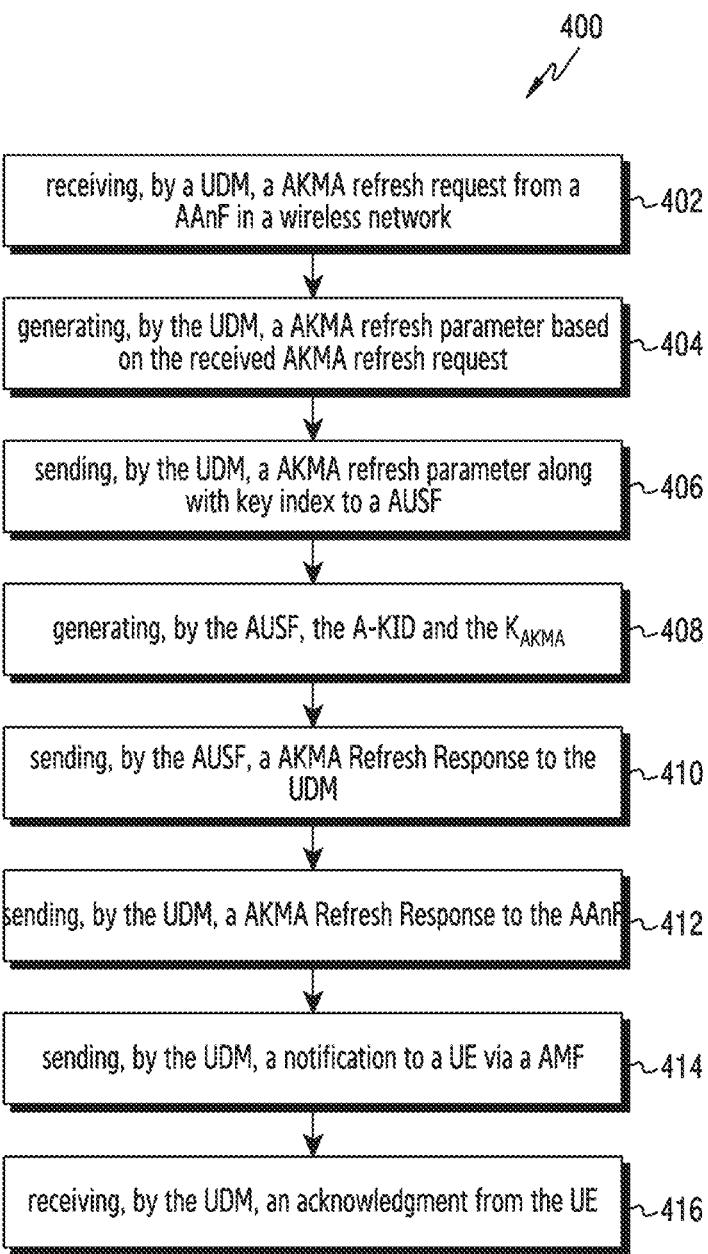

400 receiving, by a UDM, a AKMA refresh request from a AAnF in a wireless network ~402 generating, by the UDM, a AKMA refresh parameter based on the received AKMA refresh request ~404 sending, by the UDM, a AKMA refresh parameter along with key index to a AUSF ~406 generating, by the AUSF, the A-KID and the $K_{AKMA}$ ~408 sending, by the AUSF, a AKMA Refresh Response to the UDM ~410 sending, by the UDM, a AKMA Refresh Response to the AAnF ~412 sending, by the UDM, a notification to a UE via a AMF ~414 receiving, by the UDM, an acknowledgment from the UE ~416

FIG.4A

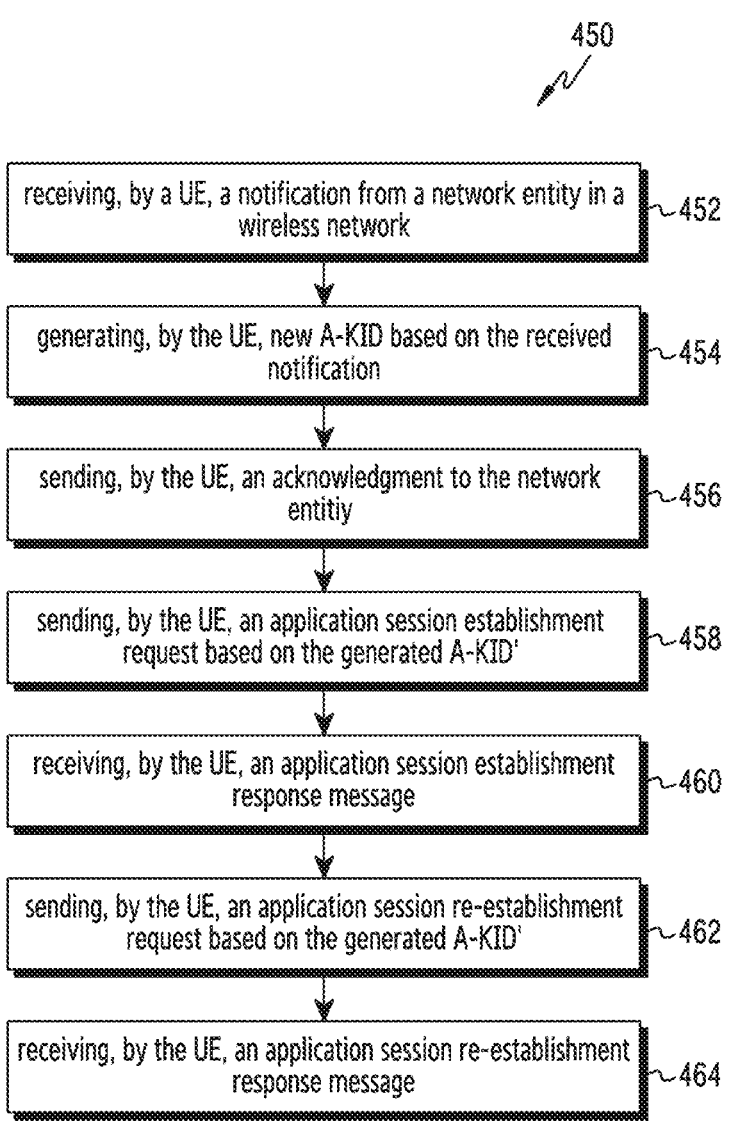

450

| | |
|---|---|
| receiving, by a UE, a notification from a network entity in a wireless network | ~452 |
| generating, by the UE, new A-KID based on the received notification | ~454 |
| sending, by the UE, an acknowledgment to the network entitiy | ~456 |
| sending, by the UE, an application session establishment request based on the generated A-KID' | ~458 |
| receiving, by the UE, an application session establishment response message | ~460 |
| sending, by the UE, an application session re-establishment request based on the generated A-KID' | ~462 |
| receiving, by the UE, an application session re-establishment response message | ~464 |

FIG.4B

APPARATUS AND METHOD FOR COMMUNICATION ESTABLISHMENT IN AUTHENTICATION AND KEY MANAGEMENT FOR APPLICATIONS (AKMA)

TECHNICAL FIELD

The present invention relates generally to an authentication in a wireless network, and more particularly, to a system and method for communication establishment by storing and retrieving a refreshed key in Authentication and Key Management for Applications (AKMA). The present application is based on, and claims priority from an Indian application Ser. No. 202141033834 filed on 28 Jul. 2021, the disclosure of which is hereby incorporated by reference herein.

BACKGROUND ART 5G mobile communication technologies define broad frequency bands such that high transmission rates and new services are possible, and can be implemented not only in "Sub 6 GHZ" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

$3^{rd}$ Generation Partnership Project (3GPP) Rel-16 introduces a new feature known as authentication and key management for applications (AKMA) which is based on 3GPP user's credentials in 5G. The AKMA leverages user's Authentication and Key Agreement (AKA) credentials to bootstrap security between a user equipment (UE) and an application function (AF), which allows the UE to securely exchange data with the AF.

According to the 3GPP, an AKMA key (KAKMA) is refreshed or a new AKMA key is generated by performing a primary authentication as described in TS 33.535, and a AF key (KAF) is refreshed or a new KAF is generated upon generating new KAKMA. However, the KAF is associated with a timer which indicates a lifetime of the KAF. When the lifetime of the KAF expires, the AF may reject the UE access to the AF. Upon the expiry of the KAF and if there has been a change of AUSF key (KAUSF) due to a successful run of the primary authentication, the UE may re-try accessing the AF by using a new AKMA Key Identity (A-KID) derived from a new KAUSF.

Thus, the KAF may not be refreshed immediately after the expiry of the lifetime of the KAF, until a new primary authentication takes place. Therefore, a user may not be able to use an application (requiring authentication using AKMA) after the KAF expires and until the new primary authentication procedure takes place (which may happen after a very long period of time). However, the KAF should be refreshed when needed by applications that are depending on the KAF and hence a mechanism is required for the AKMA service to request network to provide the refreshing parameters to refresh the AKMA key and the AF key. Further, performing the primary authentication whenever there is a need to generate the new KAF requires a huge effort, as performing the primary authentication is a heavy approach which requires heavy computations and consuming a lot of memory.

Further, as per 3GPP TS 33.535, the KAF can be refreshed over Ua*, however this not only depends on whether the Ua* protocol supports such functionality, an operator or application may deliberately not want to implement KAF refresh over Ua*, and rather depend on AKMA validation by the network every time. If the key refresh is supported by the Ua* protocol, then the KAF refresh is performed independently, any number of times; which leads to the issue of exploiting the subscription credential(s) in 5G system and issues with lawful interception which is part of the regulatory requirements in certain regions.

Further, there are scenarios in which a User Equipment (UE) and a AKMA Anchor Function (AAnF) is having a new KAF and the AF is having an old KAF key (or) the AF derives the new key based on the Ua* protocol, whereas the UE doesn't know that it needs to derive the new key and use the latest key. In such cases the key synchronisation issue can occur, mainly due to misalignment of the context derived at different entities and non-coordination.

Thus, it is desired to address the above mentioned disadvantages or other shortcomings or at least provide a useful alternative.

DISCLOSURE OF INVENTION

Technical Problem

The principal object of the embodiments herein is to provide a method for communication establishment in AKMA by storing and retrieving a refreshed key. In the present disclosure, whenever a lifetime of an AF key (KAF) expires, a new AF key (KAF') is generated without performing a primary authentication. Thus, reducing the signalling overhead for generating the new KAF, by generating the new KAF without using the primary authentication.

Another object of embodiments herein is to provide a method to include a key index as a part of a AKMA Key Identifier (A-KID) to store and retrieve a refreshed key (KAF).

Another object of embodiments herein is to provide a system and method to identify a latest refreshed key (KAF) using a key index.

Another object of embodiment herein is to support inclusion of key ID in a User Equipment (UE) access request, regardless of the Ua* protocol in use.

Another object of embodiment herein is to provide a system and method to avoid the key synchronization issue when the key is refreshed either at UE or at network side and AF is having an old keyor the AF derives the new Key based on Ua* protocol, but UE doesn't know that it needs to derive the new key and use the latest key (KAF), by defining a method where the AKMA Key ID having the key index indicates to the refreshed key.

Solution to Problem

Accordingly, the embodiment herein is to provide a method performed by a Unified Data Management (UDM) in a wireless network for establishing communication between at least one User Equipment (UE) and at least one Application Function (AF). The method comprises receiving, by the UDM, a first request from an Authentication and Key Management for Application (AKMA) Anchor Function (AAnF) in the wireless network, wherein the first request comprises a AKMA refresh request indication, at least one Subscription Permanent Identifier (SUPI) associated with the at least one User Equipment (UE), at least one Application Function Identity (AF ID), and a key index; generating, by the UDM, a AKMA refresh parameter (AK-MARP) based on the received first request; and sending, by the UDM, the generated AKMA refresh parameter (AK-MARP), the at least one SUPI, and the key index to a Authentication Server Function (AUSF) in the wireless network for generating a new AKMA Key Identifier (A-KID).

Accordingly the embodiment herein is to provide a method performed by an Authentication Server Function (AUSF) in a wireless network for establishing communication between at least one User Equipment (UE) and at least one Application Function (AF). The method comprises receiving, by the AUSF, a first request from a Unified Data Management (UDM) in the wireless network, wherein the first request comprises an Authentication and Key Management for Application (AKMA) refresh parameter (AK-MARP), at least one Subscription Permanent Identifier (SUPI) associated with the at least one User Equipment (UE), and a key index; generating, by the AUSF, a new AKMA Key Identifier (A-KID) based on the received first request, wherein the generated new A-KID includes the key index; and sending, by the AUSF, the generated new A-KID to a AKMA Anchor Function (AAnF) in the wireless network, wherein the AAnF is associated with the at least one AF.

Accordingly the embodiment herein is to provide a method for establishing communication between a User Equipment (UE) and at least one Application Function (AF). The method comprises receiving, by the UE, a first request from a Unified Data Management (UDM) in the wireless network, wherein the first request comprises a Authentication and Key Management for Application (AKMA) refresh parameter (AKMARP), and a key index; generating, by the UE, a new AKMA Key Identifier (A-KID) based on the received first request, wherein the generated new A-KID includes the key index; sending, by the UE, a second request based on the generated new A-KID to the at least one AF, wherein the second request is an application session establishment request for establishing the communication between the UE and the at least one AF; and receiving, by the UE, one of an application session establishment response message and a reject message from the at least one AF based on the second request sent.

Accordingly the embodiment herein is to provide a method for establishing communication between at least one User Equipment (UE) and an Application Function (AF).

The method comprises receiving, by the AF, a first request from the at least one UE, wherein the first request is an application session establishment request that includes an Authentication and Key Management for Application (AKMA) Key Identifier (A-KID) for establishing the communication between the at least one UE and the AF; determining, by the AF, whether a key index included the A-KID corresponds to a new Application Function key (KAF) available in an Authentication and Key Management for Application (AKMA) Anchor Function (AAnF) associated with the AF; and performing, by the AF, one of: sending an application session establishment response message in response to the determination that the key index corresponds to the new KAF; and sending a reject message in response to the determination that the key index does not corresponds to the new KAF.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

Aspects of the present disclosure provide efficient communication methods in a wireless communication system.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 4A illustrates a flow diagram illustrating various operations implemented by the network entity, according to the embodiments as disclosed herein;

FIG. 4B illustrates a flow diagram illustrating various operations implemented by the UE, according to the embodiments as disclosed herein;

MODE FOR THE INVENTION

Figure 1:
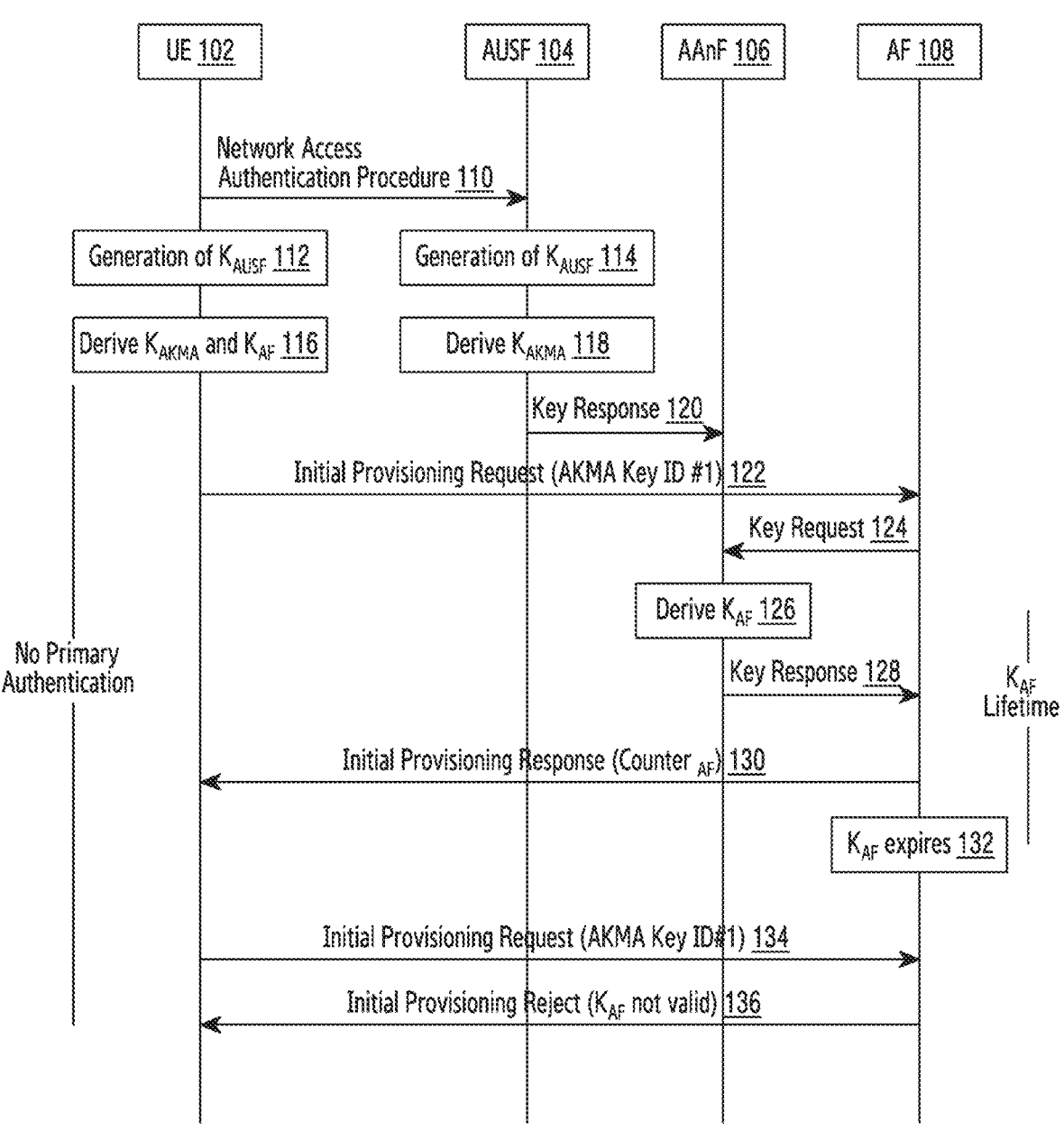
FIG. 1 illustrates a scenario of sequence flow of a method for establishing communication between a user equipment (UE) and an application function (AF), according to the prior arts.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terms "electronic device", "user equipment", and "UE" mean the same and are used interchangeably throughout this document.

Accordingly the embodiment herein is to provide a method for establishing communication between at least one User Equipment (UE) and an Application Function (AF). The method comprises receiving, by the AF, a first request from the at least one UE, wherein the first request is an application session establishment request that includes an Authentication and Key Management for Application (AKMA) Key Identifier (A-KID) for establishing the communication between the at least one UE and the AF; determining, by the AF, whether a key index included the A-KID corresponds to a new Application Function key (KAF) available in an Authentication and Key Management for Application (AKMA) Anchor Function (AAnF) associated with the AF; and performing, by the AF, one of: sending an application session establishment response message in response to the determination that the key index corresponds to the new KAF; and sending a reject message in response to the determination that the key index does not corresponds to the new KAF.

In the conventional methods and systems, the AF key (KAF) may not be refreshed immediately after its lifetime expiry, until a new primary authentication takes place. This means a user may not be able to use an application (requiring authentication using AKMA) after the KAF expires and until the new primary authentication procedure takes place (which may happen after a very long period of time). However, the KAF should be refreshed when needed by the applications that are depending on the KAF and hence a mechanism is required for the AKMA service to request the network to provide the refreshing parameters to refresh the AKMA key and the AF key. Further, performing the new primary authentication whenever there is a need to generate a new KAF requires a huge effort, as performing the new primary authentication is a heavy approach. Unlike to the conventional methods and systems, in the present disclosure the new AF key is generated without requiring to perform any primary authentication.

Referring now to the drawings and more particularly to FIGS. 1 through 8, where similar reference characters denote corresponding features consistently throughout the figures, there are shown preferred embodiments.

FIG. 1 illustrates a scenario of sequence flow of a method for establishing communication between a user equipment (UE) and an application function (AF), according to the prior arts. As shown in FIG. 1, at step 110, the UE 102 initiates a network access authentication procedure by making a request to an AUSF 104 to register the UE 102 for the AKMA services. At step 112, when the network access authentication procedure is completed, the UE 102 generates an AUSF key (KAUSF). Similarly, at step 114, the AUSF 104 also generates the AUSF key (KAUSF). At step 116, the UE 102 derives an AKMA key (KAKMA) 116 based on the KAUSF generated. The UE 102 then derives an AF key (KAF) using the KAKMA. Similarly, at step 118, the AUSF 104 derives KAKMA based on the KAUSF generated. Upon the KAKMA is derived, at step 120, the AUSF 104 sends a key response to an AAnF 106. At step 122, the UE 102 then initiates an application session establishment request using A-KID1 112. At step 124, the AF 108 upon receiving the application session establishment request from the UE 102 will send a key request to the AAnF 106. At step 126, the AAnF 106 then derives the KAF 126 using the A-KID1. At step 128, the AAnF 106, upon generating the KAF, sends a key response to the AF 108. At step 130, the AF 108 sends an initial provisioning response which includes Counter AF to the UE 102. Upon the expiry of the KAF, at step 132 and 134, when the UE 102 send the initial provisioning request using the previous A-KID1, the AF 108 rejects the request as the KAF associated with the A-KID1 is not valid. At step 136, the AF 108 cannot provide application access to the UE 102 and a new KAF for the AF cannot be generated until next primary authentication takes place as per conventional method. Thus, the UE 102 may not be able to use an application requiring the AKMA service from the AF 108.

Figure 2:
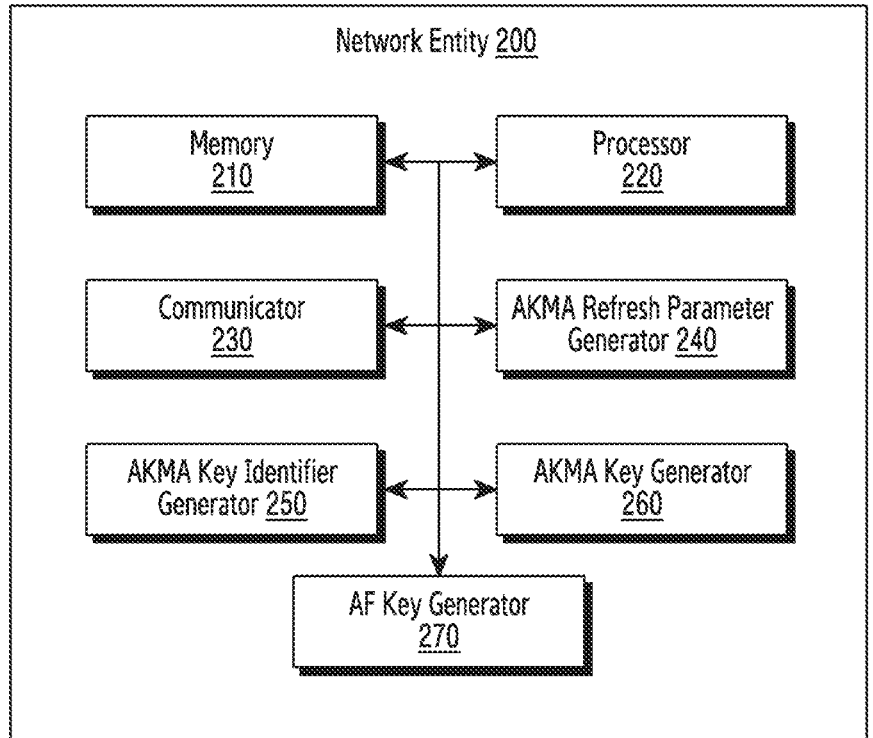
FIG. 2 illustrates a block diagram of a network entity for establishing communication with the UE, according to the embodiments as disclosed herein.

FIG. 2 illustrates a block diagram of the network entity 200 for establishing communication with the UE 102, according to the embodiments as disclosed herein. In an embodiment, the network entity 200 includes a memory 210, a processor 220, a communicator 230, a AKMA refresh parameter generator 240, a AKMA key identifier generator 250, a AKMA key generator 260, and a AF key generator 270. In an embodiment, the network entity 200 comprises an AMF 201, an AUSF 202, a UDM 203, an AAnF 204, and an AF 205 (not shown in the FIG. 2). In another embodiment, the network entity 200 can be one of the AMF 201, the AUSF 202, the UDM 203, the AAnF 204, and the AF 205.

The memory 210 also stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "nontransitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). In an embodiment, the memory 210 can be an internal storage unit or it can be an external storage unit of the network entity 200, a cloud storage, or any other type of external storage.

The processor 220 communicates with the memory 210, the communicator 230, the AKMA refresh parameter generator 240, the AKMA key identifier generator 250, the AKMA key generator 260, and the AF key generator 270. The processor 220 is configured to execute instructions stored in the memory 210 and to perform various processes. The communicator 230 is configured for communicating internally between internal hardware components and with external devices via one or more networks.

In an embodiment, the AKMA refresh parameter generator 240 generates an AKMA refresh parameter (AKMARP). The AKMARP can be generated by one of the AUSF 202, the UDM 203, and the AAnF 204 based on an AKMA refresh indication request received. In one embodiment, the AKMARP can be a random (RAND) value, a Counter AKMA, and a Counter AF value.

In an embodiment, the AKMA key identifier generator 250 generates a new AKMA key identifier (A-KID'). The AKMA key identifier generator 250 generates the new AKMA key identifier (A-KID') by generating a new AKMA temporary identifier (A-TID'). The AKMA key identifier generator 250 generates the new AKMA temporary identifier (A-TID') based on the AUSF key (KAUSF), a present AKMA temporary identifier (A-TID), the AKMA refresh parameter (AKMARP), key index, and the at least one SUPI associated with UE 300. In one embodiment, the AKMA key identifier generator 250 generates the new AKMA temporary identifier (A-TID') by inputting the AUSF key (KAUSF), the present AKMA temporary identifier (A-TID), the AKMA refresh parameter (AKMARP), the key index, and the at least one SUPI associated with UE 300 to the KDF as shown in eq. (1).

$$A\text{-}TID' = KDF(\text{"}A\text{-}TID\text{"}, KAUSF, AKMARP, \text{Key Index}, SUPI) \quad (1)$$

In an embodiment, the A-TID itself is derived using the key index along with "A-TID", SUPI and KAUSF as input parameters to the KDF.

In an embodiment, the AKMA key generator 260 generates a new AKMA key (KAKMA'). The AKMA key generator 260 generates the new AKMA key (KAKMA') based on an AKMA, an AUSF key (KAUSF), an AKMA refresh parameter (AKMARP), and the at least one SUPI associated with the UE 102. In one embodiment, the new AKMA key (K'AKMA) is generated by inputting the AKMA, the AUSF key (KAUSF), the AKMA refresh parameter (AKMARP), and the at least one SUPI associated with the UE 102 to a key distribution function (KDF) as shown in eq. (2).

$$KAKMA' = KDF(SUPI, KAUSF, \text{"}AKMA\text{"}, AKMARP) \quad (2)$$

In an embodiment, the AF key generator 270 generates a new Application Function (AF) key. The AF key generator 270 generates the new Application Function (AF) key based on the AKMA key (KAKMA), an identifier of at least one AF (AF-ID), the AKMA refresh parameter (AKMARP). In one embodiment, the AF key generator 270 generates the new Application Function (AF) key (KAF) by inputting at least one of the AKMA key (KAKMA), the identifier of at least one AF (AF-ID), the key index, and the AKMA refresh parameter (AKMARP) to the KDF as shown in eq. (3).

$$KAF' = KDF(KAKMA, AF\text{-}ID, \text{key index}, AKMARP) \quad (3)$$

Although the FIG. 2 shows various hardware components of the network entity 200 but it is to be understood that other embodiments are not limited thereon. In other embodiments, the network entity 200 may include less or more number of components. Further, the labels or names of the components are used only for illustrative purpose and does not limit the scope of the invention. One or more components can be combined together to perform same or substantially similar function to generate the new AKMA key and the new AF key for establishing communication between the UE 102 and the AF 205 in the wireless network.

Figure 3:
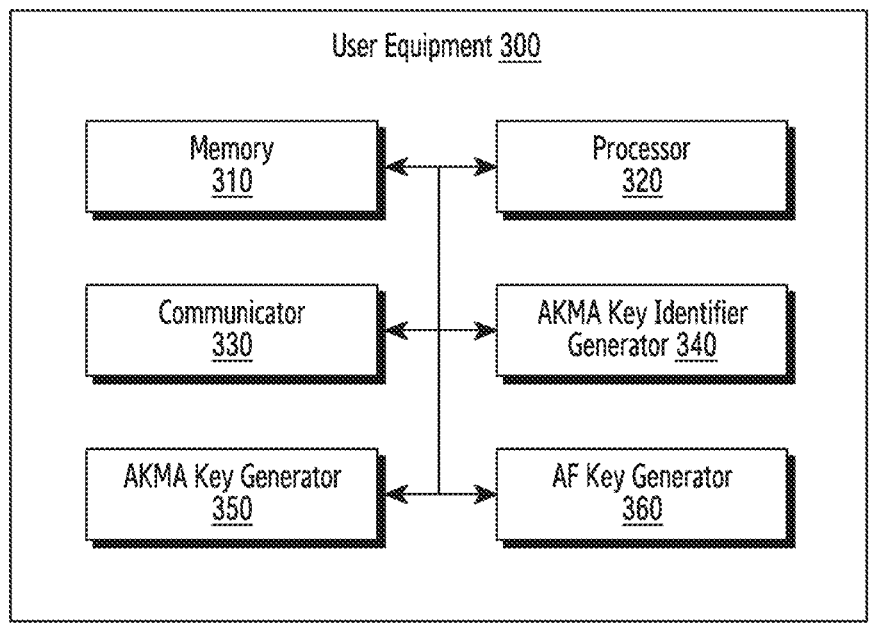
FIG. 3 illustrates a block diagram of the UE for establishing communication with the network entity, according to the embodiments as disclosed herein.

FIG. 3 illustrates a block diagram of the UE 300 for establishing communication with the network device 200, according to the embodiments as disclosed herein. In an embodiment, the user equipment 300 includes a memory 310, a processor 320, a communicator 330, an AKMA key identifier generator 340, an AKMA key generator 350, and an AF key generator 360.

The memory 310 also stores instructions to be executed by the processor 320. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "nontransitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache). In an embodiment, the memory 310 can be an internal storage unit or it can be an external storage unit of the User Equipment (UE) 300, a cloud storage, or any other type of external storage.

The processor 320 communicates with the memory 310, the communicator 330, the AKMA key identifier generator 340, the AKMA key generator 350, and the AF key generator 360. The processor 320 is configured to execute instructions stored in the memory 310 and to perform various processes. The communicator 330 is configured for communicating internally between internal hardware components and with external devices via one or more networks.

In an embodiment, the AKMA key identifier generator 340 generates a new AKMA key identifier (A-KID'). The AKMA key identifier generator 340 generates the new AKMA key identifier (A-KID') by generating a new AKMA temporary identifier (A-TID'). The AKMA key identifier generator 340 generates the new AKMA temporary identifier (A-TID') based on the AUSF key (KAUSF), the present AKMA temporary identifier (A-TID), the AKMA refresh parameter (AKMARP), the key index, and the at least one SUPI associated with the UE 300. In one embodiment, the AKMA key identifier generator 340 generates the new AKMA temporary identifier (A-TID') by inputting the AUSF key (KAUSF), the present AKMA temporary identifier (A-TID), the AKMA refresh parameter (AKMARP), and the key index the at least one SUPI associated with the UE 300 to the KDF as shown in eq. (1).

In an embodiment, the AKMA key generator 350 generates a new AKMA key (KAKMA'). The AKMA key generator 350 generates the new AKMA key (KAKMA') based on an AKMA, an AUSF key (KAUSF), an AKMA refresh parameter (AKMARP), and at least one SUPI associated with the UE 300. In one embodiment, the new AKMA key (K'AKMA) is generated by inputting the AKMA, the AUSF key (KAUSF), the AKMA refresh parameter (AKMARP), and the at least one SUPI associated with the UE 300 to a key distribution function (KDF) as shown in eq. (2). In an embodiment, the AF key generator 360 generates a new Application Function key (KAF'). The AF key generator 360 generates the new Application Function (KAF') key based on the new AKMA key (KAKMA'), an identifier of the AF 205 (AF-ID), the key index, and the AKMA refresh parameter (AKMARP). In one embodiment, the AF key generator 360 generates the new Application Function (KAF') key by inputting at least one of the new AKMA key (KAKMA'), the identifier of at least one AF (AF-ID), the key index, and the AKMA refresh parameter (AKMARP) to the KDF as shown in eq. (3).

Although the FIG. 3 shows various hardware components of the user equipment 300 but it is to be understood that other embodiments are not limited thereon. In other embodiments, the user equipment 300 may include less or more number of components. Further, the labels or names of the components are used only for illustrative purpose and does not limit the scope of the invention. One or more components can be combined together to perform same or substantially similar function to generate the new AKMA key and the new AF key for establishing communication between the UE 300 and the application function (AF) in the wireless network.

FIG. 4A illustrates a flow diagram illustrating various operations implemented by the network entity 200 for generating the new AKMA Key and the new AF Key, according to the embodiments as disclosed herein.

At 402, the method includes receiving, by the UDM 203, the AKMA refresh request from the AAnF 204. In one embodiment, the AKMA refresh request received from the AAnF 204 includes an AKMA refresh indicator, a key index, an AF ID, and the at least one SUPI associated with the at least one user equipment (UE) 300.

At block 404, the method includes generating, by the UDM 203, an AKMA refresh parameter based on the received AKMA refresh request. In one embodiment, the AKMA refresh parameter generator 240 generates the AKMA refresh parameter (AKMARP). The AKMARP can be generated by one of the AUSF 202, the UDM 203, and the AAnF 204 based on the AKMA refresh indication request received. In one embodiment, the AKMARP can be at least one of the random (RAND) value, the Counter AKMA, and the Counter AF value.

At block 406, the method includes sending, by the UDM 203, the AKMA refresh parameter (AKMARP) to the AUSF 202. In one embodiment, the UDM 203 sends the AKMA refresh parameter (AKMARP) along with the at least one SUPI associated with the UE 300300 to the AUSF 202.

At block 408, the method includes generating, by the AUSF 202, new AKMA key identifier (A-KID') and new AKMA key (KAKMA') and associated. Further, in an embodiment, the AKMA key identifier generator 250 generates the new AKMA key identifier (A-KID'). The AKMA key identifier generator 250 generates the new AKMA key identifier (A-KID') by generating the new AKMA temporary identifier (A-TID'). The AKMA key identifier generator 250 generates the new AKMA temporary identifier (A-TID') based on the AUSF key (KAUSF), the present AKMA temporary identifier (A-TID), the AKMA refresh parameter (AKMARP), the key index, and the at least one SUPI associated with the UE 300. In one embodiment, the AKMA key identifier generator 250 generates the new AKMA temporary identifier (A-TID') by inputting the AUSF key (KAUSF), the present AKMA temporary identifier (A-TID), the AKMA refresh parameter (AKMARP), the key index and the at least one SUPI associated with the UE 300 to the KDF as shown in eq. (1).

In an embodiment, the AKMA key generator 260 generates the new AKMA key (KAKMA'). The AKMA key generator 260 generates the new AKMA key (KAKMA') based on the AKMA, the AUSF key (KAUSF), the AKMA refresh parameter (AKMARP), and the at least one SUPI associated with the UE 300. In one embodiment, the new AKMA key (KAKMA') is generated by inputting the AKMA, the AUSF key (KAUSF), the AKMA refresh parameter (AKMARP), and the at least one SUPI associated with the UE 300 to the KDF as shown in eq. (2).

At block 410, the method includes sending, by the AUSF 202, an AKMA Refresh response to the UDM 203. In one embodiment, the AUSF 202 sends the AKMA refresh response to the UDM 203. The AKMA refresh response includes an acknowledgement for the AKMA refresh request received from the UDM 203. The AKMA refresh response also includes the AF ID, the key index, the AKMA MAC-IAUSF, the AKMARP, and the Counter AKMA.

At block 412, the method includes sending, by the UDM 203, an AKMA Refresh Response to the AAnF 204. In one embodiment, the UDM 203 sends the AKMA Request Refresh Response to the AAnF 204. In one embodiment, the AKMA Refresh Response includes the new AKMA key (KAKMA'), the at least one SUPI associated with UE 300, the key index, the AF ID, and the new AKMA key identifier (A-KID').

At block 414, the method includes sending, by the UDM 203, a notification to the UE 300 via the AMF 201. In one embodiment, the UDM 203 sends the notification to the UE 300 via the AMF 201. The notification includes at least one of the AKMA refresh parameter (AKMARP), the AKMA MAC-IAUSF, the key index, and the Counter AKMA.

At block 416, the method includes receiving, by the UDM 203, an acknowledgement from the UE 300 via the AMF 201. In one embodiment, the UDM 203 receives the acknowledgement from the UE 300.

FIG. 4B is a flow diagram illustrating various operations implemented by the UE 300, according to the embodiments as disclosed herein.

At block 452, the method includes receiving, by the UE 300, a notification from the UDM 203. In one embodiment, the UE 300 receives the notification from the UDM 203. In one embodiment, the UE 300 receives the notification from the UDM 203 via the AMF 201. The notification includes at least one of AKMA refresh parameter (AKMARP), the key index, AKMA MAC-IAUSF, and Counter AKMA.

At block 454, the method includes generating, by the UE 300, a new AKMA key identifier (A-KID) based on the received notification. In another embodiment, the AKMA key identifier generator 340 generates the new AKMA key identifier (A-KID'). The AKMA key identifier generator 340 generates the new AKMA key identifier (A-KID') by generating the new AKMA temporary identifier (A-TID'). The AKMA key identifier generator 340 generates the new AKMA temporary identifier (A-TID') based on the AUSF key (KAUSF), the present AKMA temporary identifier (A-TID), the AKMA refresh parameter (AKMARP), the key index and the at least one SUPI associated with the UE 300. In one embodiment, the AKMA key identifier generator 340 generates the new AKMA temporary identifier (A-TID') by inputting the AUSF key (KAUSF), the present AKMA temporary identifier (A-TID), the AKMA refresh parameter (AKMARP), the key index, and the at least one SUPI associated with the UE 300 to the KDF as shown in eq. (1). In an embodiment, the AKMA key generator 350 generates a new AKMA key (KAKMA'). The AKMA key generator 350 generates the new AKMA key (KAKMA') based on the AKMA, the AUSF key (KAUSF), the AKMA refresh parameter (AKMARP), and the at least one SUPI associated with the UE 300. In one embodiment, the new AKMA key (K'AKMA) is generated by inputting the AKMA, the AUSF key (KAUSF), the AKMA refresh parameter (AKMARP), and the at least one SUPI associated with the UE 300 to the KDF as shown in eq. (2).

At 456, the method includes sending, by the UE 300, an acknowledgement to the UDM 203. In one embodiment, the UE 300 sends the acknowledgement to the UDM 203 via the AMF 201.

At 458, the method includes sending, by the UE 300, an application session establishment request to the AF 205. In one embodiment, the UE 300 sends the application session establishment request to the AF 205 based on the new AKMA key identifier (A-KID'). The new A-KID includes the key index value.

At 460, the method includes receiving, by the UE 300, an application session establishment response message from the AF 205. In one embodiment, the application session establishment response message includes a success message when the latest key index corresponds to the new KAF available at the AF 205. In one embodiment, the application session establishment response message includes a reject message when the latest key index corresponds to the new KAF available at the AF 205.

At 462, the method includes sending, by the UE 300, an application session reestablishment request to the AF 205. In one embodiment, the UE 300 sends the application session re-establishment request to the AF 205 by retrieving the latest key index and the Application Function Key (KAF).

At 464, the method includes receiving, by the UE 300, an application session reestablishment response message from the AF 205. In one embodiment, the application session re-establishment response message includes a success message when the latest key index corresponds to the new KAF available at the AF 205. In one embodiment, the application session re-establishment response message includes a reject message when the latest key index does not corresponds to the new KAF available at the AF 205.

Figure 5:
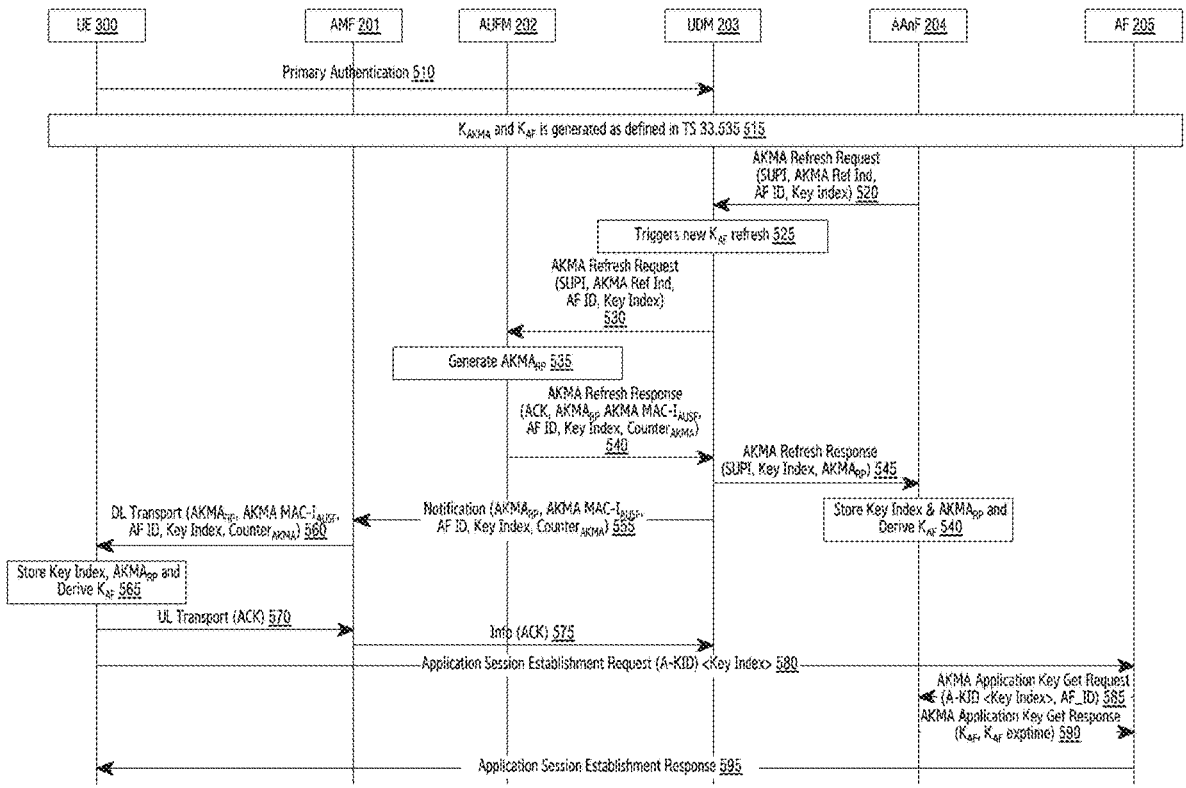
FIG. 5 illustrates an example sequential flow diagram illustrating communication establishment in AKMA, according to the embodiments as disclosed herein.

FIG. 5 illustrates an example sequential flow diagram illustrating generation of the new AKMA Key and associated AKMA Key Identifier, according to the embodiments as disclosed herein.

At 510, the UE 300 performs a primary authentication with network entity by registering with the UDM 203. After performing the primary authentication the UE 300 and the AUSF 202 will derive the AUSF Key (KAUSF) as specified in TS 33.501.

At 515, the UE 300 and the AF 205 will derive the KAKMA and KAF as per TS 33.535. In an embodiment, the initial key (KAF) derived from the fresh KAUSF is indexed to a reserved value and used to retrieve the key derived from the fresh KAUSF initially.

At 520, the AAnF 204 sends the AKMA refresh request to the UDM 203. In one embodiment, the AKMA refresh request received from the AAnF 204 includes an AKMA refresh indicator, an AF ID, a key index, and at least one SUPI associated with the UE 300. In one embodiment, when an application function key (KAF) lifetime is about to expire or if it is expired, the AAnF 204 sends the AKMA refresh request message to the UDM 203. In an embodiment, the AAnF 204 gets the KAF lifetime expiry indication and/or AKMA Ref Ind and/or Key Index from the AF 205, to initiate the key refresh by sending the AKMA refresh request message. In an embodiment, the AAnF 204 generates the Key Index (to identify the refreshed key, if UE 300 use the refreshed key). In an embodiment, the AAnF 204 sets the key index to '0' when a new key (KAF) in the associated AKMA context is established. The AAnF 204 sets the key index to '1' after the first calculated KAF for the AF ID, and monotonically increment it for each additional calculated KAF for the AF ID. The key index value '0' is used to calculate the first KAF from the fresh KAMKA key.

At 525, the UDM 203 triggers for the AKMA key refresh procedure (i.e., for generating a new KAF) based on the received AKMA refresh request.

At 530, the UDM 203 sends the AKMA refresh request to the AUSF 202. In one embodiment, the AKMA refresh request received from the AAnF 204 includes an AKMA refresh indicator, an AF ID, a key index, and at least one SUPI associated with the UE 300. In one embodiment, the UDM 203 sends the AKMA refresh indicator, the key index, the AF ID along with the at least one SUPI associated with the UE 300 to the AUSF 202.

At 535, the AUSF 202 generates the new AKMA refresh parameter (AKMARP) and the new AKMA key identifier (A-KID'). In one embodiment, the AKMA refresh parameter generator 240 generates an AKMA refresh parameter (AKMARP). The AKMARP can be generated by one of AUSF 202, UDM 203, and AAnF 204 based on an AKMA refresh indication request received. In one embodiment, the AKMARP can be at least one of a random (RAND) value, a Counter AKMA, and a Counter AF value. The AKMA key identifier generator 250 generates the new AKMA key identifier (A-KID') by generating the new AKMA temporary identifier (A-TID'). The AKMA key identifier generator 250 generates the new AKMA temporary identifier (A-TID') based on the AUSF key (KAUSF), "A-TID", the AKMA refresh parameter (AKMARP), the key index, and the at least one SUPI associated with the UE 300. In one embodiment, the AKMA key identifier generator 250 generates the new AKMA temporary identifier (A-TID') by inputting the AUSF key (KAUSF), "A-TID", the AKMA refresh parameter (AKMARP), the key index, and the at least one SUPI associated with the UE 300 to the KDF as shown in eq. (1).

At 540, the AUSF 202 sends an AKMA Refresh response to the UDM 203. In one embodiment, the AUSF 202 send the AKMA refresh response to the UDM 203. The AKMA refresh response includes an acknowledgement for the AKMA refresh request received from the UDM 203. The AKMA refresh response also includes the AF ID, the key index, AKMA MAC-IAUSF and Counter AKMA.

At 545, the UDM 203 sends an AKMA Refresh Response to the AAnF 204. In one embodiment, the AUSF 202 send the AKMA Refresh Response to the AAnF 204. In one embodiment, the AKMA Anchor Refresh Response includes the AKMA refresh parameter (AKMARP), the at least one SUPI associated with the UE 300, and the key index.

At 550, the AAnF 204 stores the key index and AKMARP, and derives KAF.

At 555, the UDM 203 sends a notification to the AMF 201. In one embodiment, the UDM 203 sends the notification to the AMF 201. The notification includes at least one of AKMA refresh parameter (AKMARP), the AF ID, the key index, the AKMA MAC-IAUSF, and the Counter AKMA.

At 560, the AMF 201 sends a notification to the UE 300. In one embodiment, the AMF 201 sends the notification to the UE 300. The notification includes the at least one of AKMA refresh parameter (AKMARP), the AKMA MAC-IAUSF, and the Counter AKMA.

At 565, the UE 300 stores the key index and the AKMA refresh parameter (AKMARP), and generates the new AKMA key identifier (A-KID) and AKMA Application Function key based on the received notification. In an embodiment, the AKMA key identifier generator 340 generates the new AKMA key identifier (A-KID'). The AKMA key identifier generator 340 generates the new AKMA key identifier (A-KID') by generating the new AKMA temporary identifier (A-TID'). The AKMA key identifier generator 340 generates the new AKMA temporary identifier (A-TID') based on the AUSF key (KAUSF), "A-TID", the AKMA refresh parameter (AKMARP), the key index, and the at least one SUPI associated with UE 300. In one embodiment, the AKMA key identifier generator 340 generates the new AKMA temporary identifier (A-TID') by inputting AUSF key (KAUSF), the present AKMA temporary identifier (A-TID), the AKMA refresh parameter (AKMARP), the key index, and the at least one SUPI associated with UE 300 to the key distribution function as shown in eq. (1). In another embodiment, the AF key generator 360 generates the new AF key (KAF') based on AKMA Key, AKMARP, and the AF ID.

At 570, the UE 300 sends an acknowledgement to the AMF 201. In one embodiment, the UE 300 sends the acknowledgement to the AMF 201.

At 575, the AMF 201 sends an acknowledgement to the UDM 203. In one embodiment, the AMF 201 sends the acknowledgement to the UDM 203.

At 580, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the key index included in the A-KID identifies the refreshed key (KAF) or the refresh parameter (AKMARP) to be used to derive the new key (KAF).

At 585, the AF 205 sends AKMA Application Key Get Request to the AAnF 204. In one embodiment, the AKMA Application Key Get Request from the AF 205 includes the new A-KID that includes latest key index, and the AF ID.

At 590, the AAnF 204 sends AKMA Application Key Get response to the AF 205. In one embodiment, the AAnF 204 sends the KAF corresponding to the latest key index if the key index of the KAF matches with the latest key index received from the AF 205.

At 595, the AF 205 sends an application session establishment response message to the UE 300. In one embodiment, the application session establishment response message includes a success message when the latest key index corresponds to the new KAF available at the AAnF 204. In one embodiment, the application session establishment response message includes a reject message when the latest key index docs not corresponds to the new KAF available at the AAnF 204.

Figure 6:
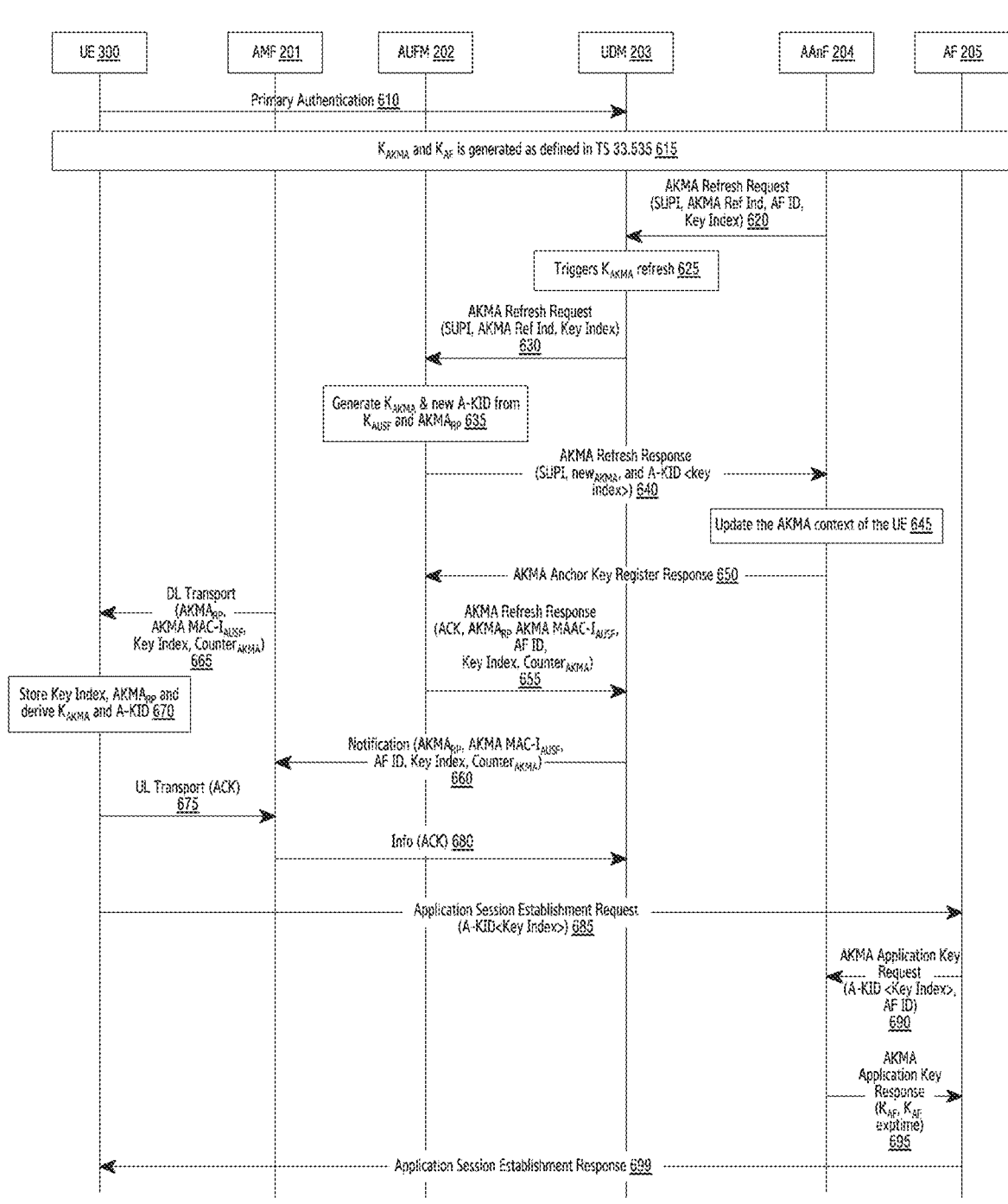
FIG. 6 illustrates another example sequential flow diagram illustrating communication establishment in AKMA, according to the embodiments as disclosed herein.

FIG. 6 illustrates another example sequential flow diagram illustrating generation of the new AKMA Key and associated AKMA Key Identifier, according to the embodiments as disclosed herein.

At 610, the UE 300 performs a primary authentication with network entity by registering with the UDM 203. After performing the primary authentication the UE 300 and AUSF 202 will derive the AUSF Key (KAUSF) as specified in TS 33.501.

At 615, the UE 300 and the AF 205 will derive the KAKMA and the KAF as per TS 33.535. In an embodiment, the initial key (KAF and KAKMA) derived from the fresh KAUSF is indexed to a reserved value and used to retrieve the key derived from the fresh KAUSF initially.

At 620, the AAnF 204 sends an AKMA refresh request to the UDM 203. In one embodiment, the AKMA refresh request received from the AAnF 204 includes an AKMA refresh indicator, an AF ID, key index, and at least one SUPI associated with the at least one user equipment (UE). In one embodiment, when an application function key (KAF) lifetime is about to expire or if it is expired, AAnF 204 sends the AKMA refresh request message to the UDM 203. In an embodiment, the AAnF 204 gets the KAF lifetime expiry indication and/or AKMA Ref Ind and/or Key Index from the AF 205, to initiate the key refresh by sending the AKMA refresh request message. In an embodiment, the AAnF 204 generates the Key Index (to identify the refreshed key, if UE 300 use the refreshed key). In an embodiment, the AAnF 204 sets the key index to '0' when a new key (KAF) in the associated AKMA context is established. The AAnF 204 sets the key index to '1' after the first calculated KAF for the AF ID, and monotonically increment it for each additional calculated KAF for the AF ID. The key index value '0' is used to calculate the first KAF from the fresh KAMKA key.

At 625, the UDM 203 triggers for AKMA Key refresh procedure (i.e., for generating a new KAKMA) based on the received AKMA refresh request.

At 630, the UDM 203 sends the AKMA refresh request to the AUSF 202. In one embodiment, the AKMA refresh request received from the AAnF 204 includes an AKMA refresh indicator, an AF ID, Key Index, and at least one SUPI associated with the UE 300. In one embodiment, the UDM 203 sends the AKMA refresh indicator, the key index, the AF ID along with the at least one SUPI associated with UE 300 to the AUSF 202.

At 635, the AUSF 202 generates the AKMA refresh parameter (AKMARP), the new AKMA key (K'AKMA) and associated AKMA key identifier (A-KID'). In one embodiment, the AKMA refresh parameter generator 240 generates the AKMA refresh parameter (AKMARP). The AKMARP can be generated by one of the AUSF 202, the UDM 203, and the AAnF 204 based on an AKMA refresh indication request received. In one embodiment, the AKMARP can be at least one of the random (RAND) value, the Counter AKMA, and the Counter AF value. The AKMA key identifier generator 250 generates the new AKMA key identifier (A-KID'). The AKMA key identifier generator 250 generates the new AKMA key identifier (A-KID') by generating the new AKMA temporary identifier (A-TID'). The AKMA key identifier generator 250 generates the new AKMA temporary identifier (A-TID') based on the AUSF key (KAUSF), "A-TID", the AKMA refresh parameter (AKMARP), the key index, and the at least one SUPI associated with UE 300. In one embodiment, the AKMA key identifier generator 260 generates the new AKMA temporary identifier (A-TID') by inputting the AUSF key (KAUSF), the present AKMA temporary identifier (A-TID), the AKMA refresh parameter (AKMARP), the key index, and the at least one SUPI associated with UE 300 to the KDF as shown in eq. (1).

In an embodiment, the AKMA key generator 260 generates the new AKMA key (KAKMA'). The AKMA key generator 260 generates the new AKMA key (KAKMA') based on the AUSF key (KAUSF), "AKMA", the AKMA refresh parameter (AKMARP), the key index, and the at least one SUPI associated with the UE 300. In one embodiment, the new AKMA key (K'AKMA) is generated by inputting the AKMA, the AUSF key (KAUSF), the AKMA refresh parameter (AKMARP), the key index, and the at least one SUPI associated with the UE 300 to the KDF as shown in eq. (2).

At 640, the AUSF 202 sends an AKMA refresh response to the AAnF 204. In one embodiment, the AUSF 202 sends the AKMA refresh response to the AAnF 204. The AKMA refresh response includes the SUPI, the key index, and the AKMARP.

At 645, the AAnF 204 updates AKMA context of the UE 300. In one embodiment, on receiving the response from the UDM 203, the AAnF 204 stores the key index, the new KAKMA, and the AKMARP along with the AKMA context of the UE 300.

At 650, the AAnF 204 sends an AKMA Anchor Key Register Response to the AUSF 202.

At 655, the AUSF 202 sends an AKMA Refresh response to the UDM 203. In one embodiment, the AUSF 202 send the AKMA refresh response to the UDM 203. The AKMA refresh response includes an acknowledgement for the AKMA refresh request received from the UDM 203. The AKMA refresh response also includes the AKMARP, the key index, AKMA MAC-IAUSF and Counter AKMA.

At 660, the UDM 203 sends a notification to the AMF 201. In one embodiment, the UDM 203 sends the notification to the AMF 201. The notification includes at least one of the AKMA refresh parameter (AKMARP), the AF ID, the key index, the AKMA MAC-IAUSF, and the Counter AKMA.

At 665, the AMF 201 sends a notification to the UE 300. In one embodiment, the AMF 201 sends the notification to the UE 300. The notification includes at least one of the AKMA refresh parameter (AKMARP), the AKMA MAC-IAUSF, the AF ID, the key index, and the Counter AKMA.

At 670, the UE 300 stores the key index and the AKMARP and generates the new AKMA key (KAKMA) and associated AKMA key identifier (A-KID) based on the received notification. In an embodiment, the AKMA key identifier generator 340 generates the new AKMA key identifier (A-KID'). The AKMA key identifier generator 340 generates the new AKMA key identifier (A-KID') by generating the new AKMA temporary identifier (A-TID'). The AKMA key identifier generator 340 generates the new AKMA temporary identifier (A-TID') based on the AUSF key (KAUSF), "A-TID", the AKMA refresh parameter (AKMARP), the key index, and the at least one SUPI associated with UE 300. In one embodiment, the AKMA key identifier generator 340 generates the new AKMA temporary identifier (A-TID') by inputting the AUSF key (KAUSF), the present AKMA temporary identifier (A-TID), the AKMA refresh parameter (AKMARP), the key index, and the at least one SUPI associated with UE 300 to the key distribution function as shown in eq. (1). In an embodiment, the AKMA key generator 350 generates the new AKMA key (KAKMA'). The AKMA key generator 350 generates the new AKMA key (KAKMA') based on the AUSF key (KAUSF), "AKMA" the AKMA refresh parameter (AKMARP), the key index, and the at least one SUPI associated with UE 300. In one embodiment, the new AKMA key (K'AKMA) is generated by inputting the AKMA, the AUSF key (KAUSF), the AKMA refresh parameter (AKMARP), the key index, and the at least one SUPI associated with the UE 300 to the KDF as shown in eq. (2).

At 675, the UE 300 sends an acknowledgement to the AMF 201. In one embodiment, the UE 300 sends the acknowledgement to the AMF 201.

At 680, the AMF 201 sends an acknowledgement to the UDM 203. In one embodiment, the AMF 201 sends the acknowledgement to the UDM 203.

At 685, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the Key Index included in the A-KID identifies the refreshed key (KAF) or the refresh parameter (AKMARP) to be used to derive the new key (KAF).

At 690, the AF 205 sends AKMA Application Key Get Request to the AAnF 204. In one embodiment, the AKMA Application Key Get Request from the AF 205 includes the A-KID that includes latest key index, and the AF ID.

At 695, the AAnF 204 sends AKMA Application Key Get response to the AF 205. In one embodiment, the AAnF 204 sends KAF corresponding to the latest key index if the key index of the KAF matches with the latest key index.

At 699, the AF 205 sends an application session establishment response message to the UE 300. In one embodiment, the application session establishment response message includes a success message when the latest key index corresponds to the new KAF available at the AAnF 204. In one embodiment, the application session establishment response message includes a reject message when the latest key index corresponds to the new KAF available at the AAnF 204.

Figure 7:
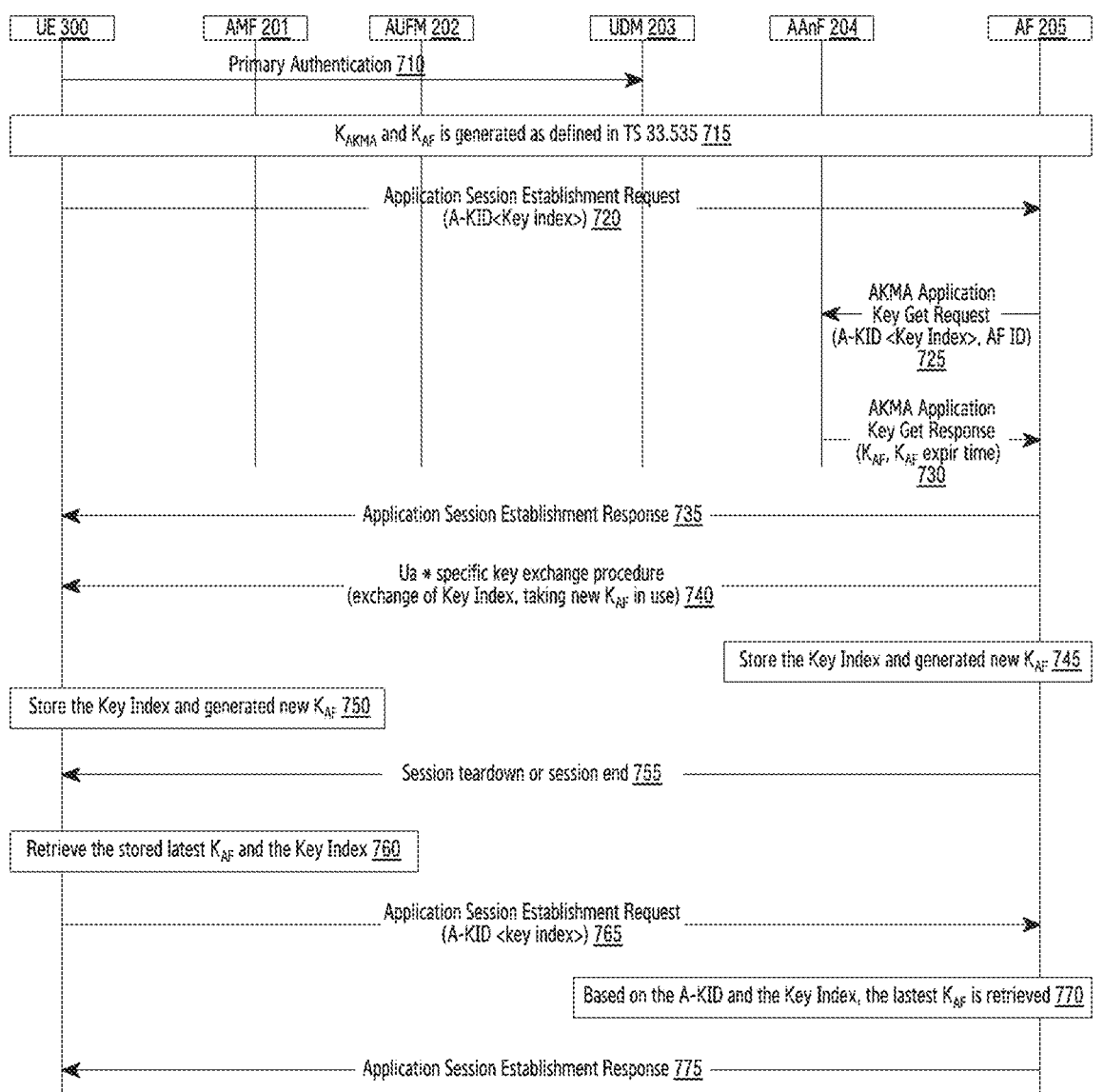
FIG. 7 illustrates yet another example sequential flow diagram illustrating communication establishment in AKMA, according to the embodiments as disclosed herein.

FIG. 7 illustrates an example sequential flow diagram illustrating generation of a now AKMA Key and associated AKMA Key Identifier, according to the embodiments as disclosed herein.

At 710, the UE 300 performs a primary authentication with network entity by registering with the UDM 203. After performing the primary authentication, the UE 300 and the AUSF 202 will derive the AUSF Key (KAUSF) as specified in TS 33.501.

At 715, the UE 300 and the AF 205 will derive the KAKMA and KAF as per TS 33.535. In an embodiment, the initial key (KAF and KAKMA) derived from the fresh KAUSF is indexed to a reserved value and used to retrieve the key derived from the fresh KAUSF initially.

At 720, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the Key Index included in the A-KID identifies the refreshed key (KAF) or the refresh parameter (AKMARP) to be used to derive the new key (KAF).

At 725, the AF 205 sends AKMA Application Key Get Request to the AAnF 204. In one embodiment, the AKMA Application Key Get Request from the AF 205 includes the A-KID that includes latest key index.

At 730, the AAnF 204 sends AKMA Application Key Get response to the AF 205. In one embodiment, the AAnF 204 sends KAF corresponding to the latest key index if the key index of the KAF matches with the latest key index.

At 735, the AF 205 sends an application session establishment response message to the UE 300. In one embodiment, the application session establishment response message includes a success message when the latest key index corresponds to the new KAF available at the AAnF 204. In one embodiment, the application session establishment response message includes a reject message when the latest key index corresponds to the new KAF available at the AAnF 204.

At 740, The UE 300 and the AF 205 perform Ua specific key refresh once the KAF is about to expire (or) the lifetime of KAF is expired. The UE 300 and the AF 205 exchange the key index and a new KAF is calculated with the Key index shared. At 745, the AF 205 stores that key index and generated new KAF.

At 750, the UE 300 stores that key index and generated new KAF.

At 755, the session teardown or session end happens between the UE 300 and the AF 205. In one embodiment, the ongoing session between UE 300 and the AF 205 teardown or end once the session gets over.

At 760, the UE 300 retrieves the stored latest KAF and corresponding latest key index.

At 765, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the Key Index included in the A-KID identifies the refreshed key (KAF) or the refresh parameter (AKMARP) to be used to derive the new key (KAF).

At 770, the AF 205 retrieves the latest KAF based on application session establishment request that includes the latest key index and the A-KID.

At 775, the AF 205 sends an application session establishment response message to the UE 300. In one embodiment, the application session establishment response message includes a reject message when the latest key index does not corresponds to the new KAF available at the AAnF 204.

Figure 8:
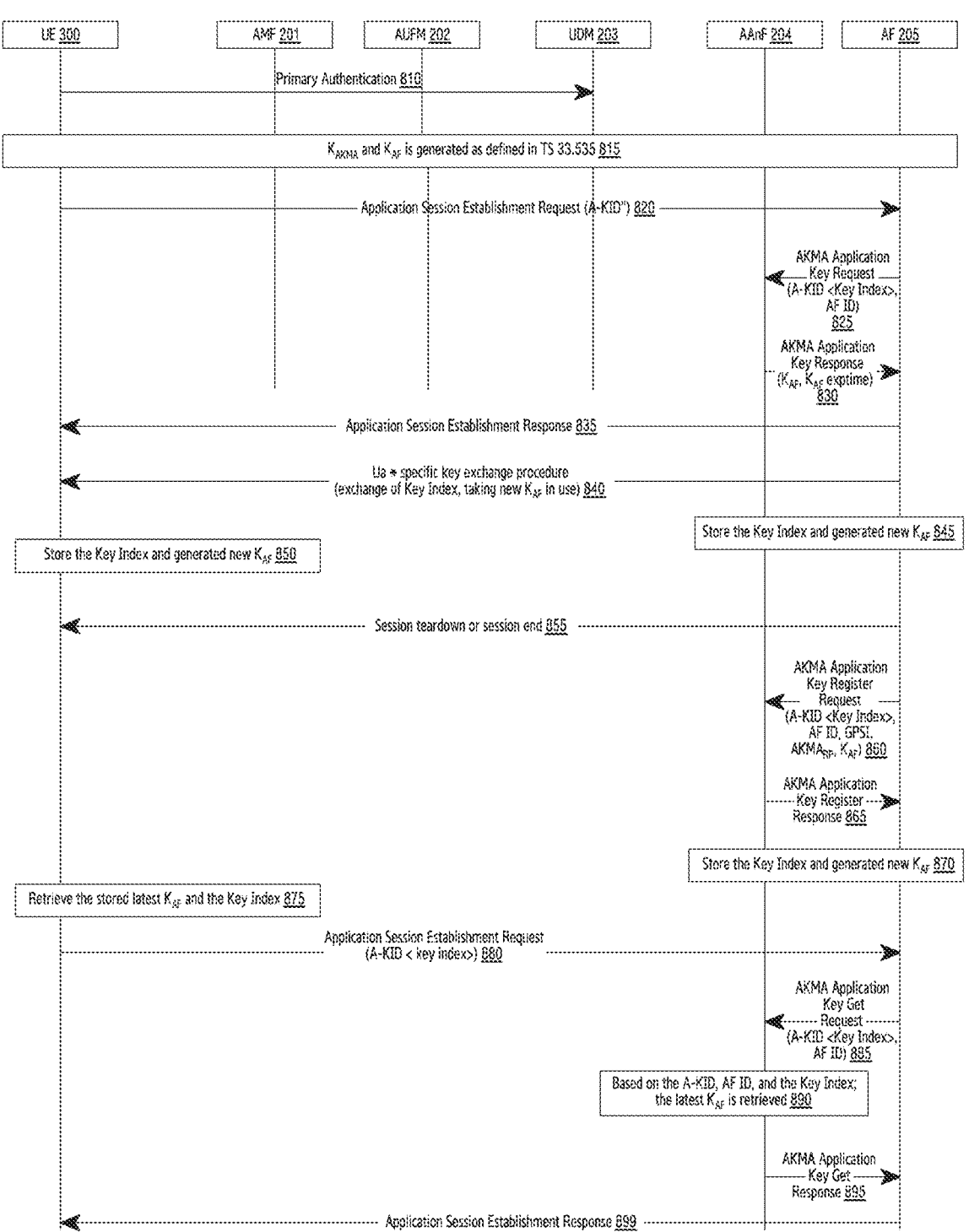
FIG. 8 illustrates yet another example sequential flow diagram illustrating communication establishment in AKMA, according to the embodiments as disclosed herein.

FIG. 8 illustrates an example sequential flow diagram illustrating generation of a new AKMA Key and associated AKMA Key Identifier, according to the embodiments as disclosed herein.

At 810, the UE 300 performs a primary authentication with network entity by registering with the UDM 203. After performing the primary authentication, the UE 300 and the AUSF 202 will derive the AUSF Key (KAUSF) as specified in TS 33.501.

At 815, the UE 300 and the AF 205 will derive the KAKMA and KAF as per TS 33.535. In an embodiment, the initial key (KAF and KAKMA) derived from the fresh KAUSF is indexed to a reserved value and used to retrieve the key derived from the fresh KAUSF initially.

At 820, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the Key Index included in the A-KID identifies the refreshed key (KAF) or the refresh parameter (AKMARP) to be used to derive the new key (KAF).

At 825, the AF 205 sends AKMA Application Key Get Request to the AAnF 204. In one embodiment, the AKMA Application Key Request from the AF 205 includes the A-KID that includes latest key index.

At 830, the AAnF 204 sends AKMA Application Key Get response to the AF 205. In one embodiment, the AAnF 205 sends KAF corresponding to the latest key index if the key index of the KAF matches with the latest key index.

At 835, the AF 205 sends an application session establishment response message to the UE 300. In one embodiment, the application session establishment response message includes a success message when the latest key index corresponds to the new KAF available at the AAnF 204. In one embodiment, the application session establishment response message includes a reject message when the latest key index corresponds to the new KAF available at the AAnF 204.

At 840, The UE 300 and the AF 205 performs Ua* specific Key refresh once the KAF is about to expire (or) the lifetime of KAF is expired. The UE 300 and AF 205 exchange the key index and a new KAF is calculated with the Key index shared.

At 845, the AF 205 stores that key index and generated new KAF.

At 850, the UE 300 stores that key index and generated new KAF.

At 855, the session teardown or session end happens between the UE 300 and the AF 205. In one embodiment, the ongoing session between UE 300 and the AF 205 teardown or end once the session gets over.

At 860, the AF 205 selects the AAnF 204 as defined in TS 33.535, and sends the A-KID, AF_ID and Key index to the AAnF 204 using the AKMA Application Key Register Request service operation. The AAnF 204 stores the latest information sent by the AF 205.

At 865, the UE 300 retrieves the stored latest KAF and corresponding latest key index.

At 870, once the AF 205 sends the A-KID, the AF_ID and key index to the AAnF 204, the AF 205 deletes the Key index and the generated KAF.

At 875, the AF 205 retrieves the latest KAF based on application session establishment request that includes the key index and the A-KID.

At 880, the UE 300 sends an application session establishment request to the AF 205. In one embodiment, the UE 300 sends the application session establishment request to the AF 205 based on the new AKMA key identifier (A-KID'). In one embodiment, the new A-KID includes the key Index of the corresponding key (KAF) to be used for the Authentication and/or authorization and/or establishment of secure interface. In an embodiment, the new A-KID shall be in NAI format as specified in clause 2.2 of IETF RFC 7542 [6], i.e. username@realm. The username part shall include the RID, Key index and the A-TID (AKMA Temporary UE Identifier), and the realm part shall include Home Network Identifier. In another embodiment, the A-KID shall be in NAI format as specified in clause 2.2 of IETF RFC 7542 [6], i.e. username@realm. The username part shall include the RID, Key index and the A-TID (AKMA Temporary UE Identifier), and the realm part shall include Home Network Identifier. The new A-KID shall be usable as a key identifier in protocols used in the reference point Ua*. The AF 205 shall be able to identify the AAnF 204 serving the UE 300 from the new A-KID. The new A-KID identifies the KAKMA key of the UE 300 and the Key Index included in the A-KID identifies the refreshed key (KAF) or the refresh parameter (AKMARP) to be used to derive the new key (KAF).

At 885, upon receiving the request from the UE 300, if the AF 205 does not have an active context associated with the A-KID, then the AF 205 sends a AKMA Application Key Get request to AAnF 204 with the A-KID to request the key (KAF) for the UE 300. The AF 205 also includes its identity (AFID) in the request.

At 890, upon receiving the key request from AF 205, the AAnF 204 retrieves the A-KID, the AF ID, the latest key index and the latest KAF key.

At 895, the AAnF 204 sends a AKMA Application Key Get response to the AF 205 with KAF and the KAF expiration time.

At 899, the AF 205 sends an application session establishment response message to the UE 300. In one embodiment, the application session establishment response message includes a reject message when the latest key index does not corresponds to the new KAF available at the AAnF 205.

Figure 9:
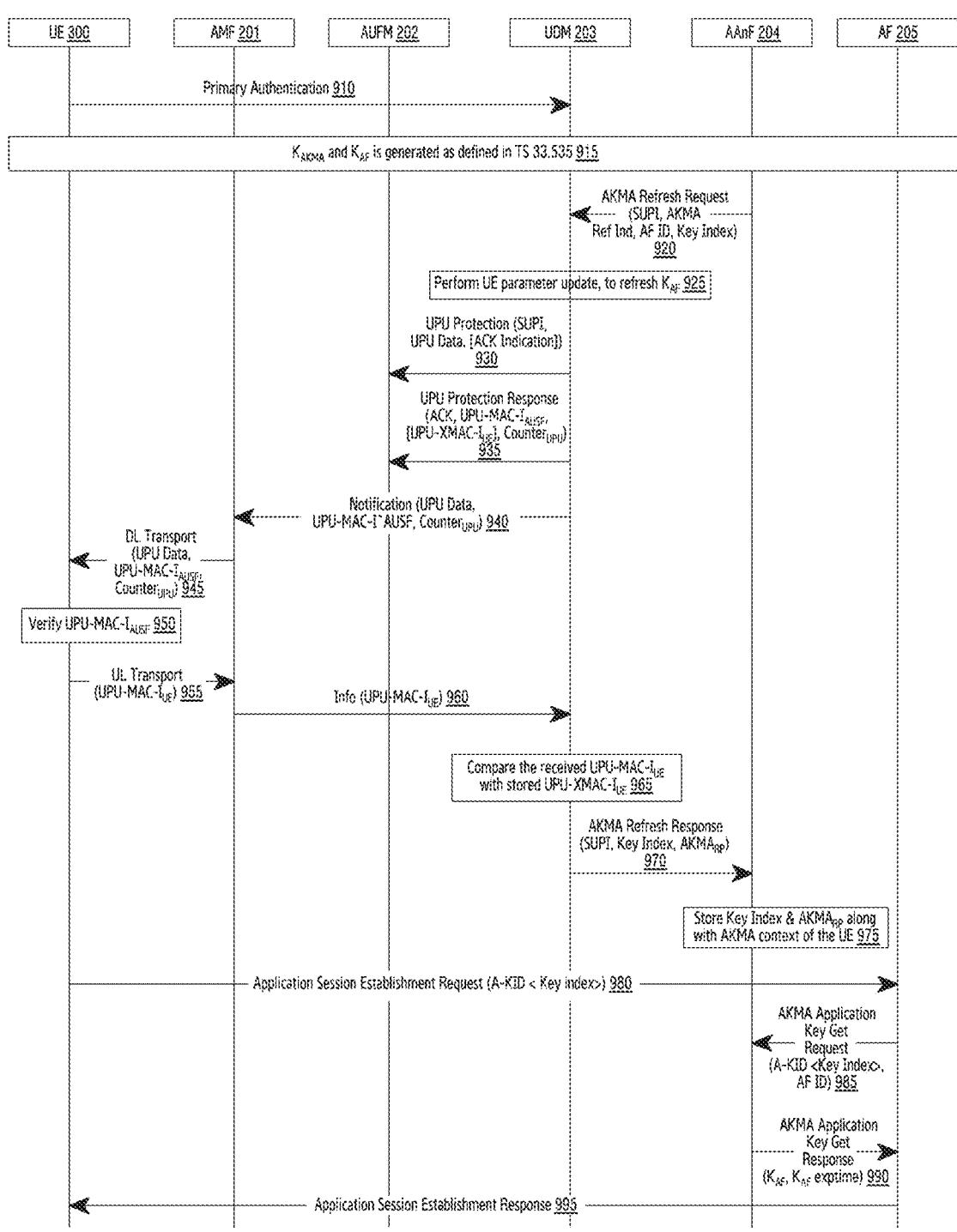
FIG. 9 illustrates an example sequential flow diagram illustrating communication establishment using UE parameters Update (UPU) procedure.

FIG. 9 illustrates an example sequential flow diagram illustrating communication establishment using UE parameters Update (UPU) procedure, according to the embodiments as disclosed herein.

At 910, the UE 300 performs a primary authentication with network entity by registering with the UDM 203. After performing the primary authentication the UE 300 and the AUSF 202 will derive the AUSF Key (KAUSF) as specified in TS 33.501.

At 915, the UE 300 and the AF 205 will derive the KAKMA and KAF as per TS 33.535. In an embodiment, the initial key (KAF) derived from the fresh KAUSF is indexed to a reserved value and used to retrieve the key derived from the fresh KAUSF initially.

At 920, when the KAF lifetime is about to expire or if it is expired, the AAnF 204 sends the AKMA refresh request message to the UDM 203. In an embodiment, the AAnF 204 gets the KAF lifetime expiry indication and/or AKMA Ref Ind and/or Key Index from the AF 205, to initiate the key refresh by sending the AKMA refresh request message. In an embodiment, the AAnF 204 generates the Key Index (to identify the refreshed key, if UE use the refreshed key). In an embodiment, the AAnF 204 sets the key index to 'O' when a new key, KAF, in the associated AKMA context is generated. The AAnF 204 sets the key index to 'l' after the first calculated KAF for the AF ID, and monotonically increment it for each additional calculated KAF for the AF ID. The key index value 'O' is used to calculate the first KAF from the fresh KAMKA key. In an embodiment, the key index is 1 bit parameter, where only two keys are indexed, for example, initial key and a refreshed key. In another embodiment, the key index is 2 bits parameter, where only four keys are indexed, for example, an initial key and three refreshed keys. In another embodiment, the key index is 3 bits parameter, where only seven keys are indexed, for example, an initial key and six refreshed keys. In one embodiment, the AKMA refresh request message includes at least one of the following: SUPI, request is for key refresh indication (AKMARef Ind), AF ID and Key Index.

At step 925, the UDM 203 triggers the UE Parameters Update (UPU) using a control plane procedure while the UE 300 is registered to the 5G system. The UDM 203 shall then prepare the UE Parameters Update Data (UPU Data) by including the parameters protected by the secured packet, if any, as well as any UE parameters. In an embodiment, the UPU Data includes at least one of: SUPI, AKMA Ref Indication, AF ID, Key Index, AKMARP.

At step 930 and 935, the UDM 203 invoke UPU Protection service operation message by including the UPU Data to the AUSF 204 to get UPU-MAC-IAUSF and Counter UPU as specified in sub-clause 14.1.4 of TS 33.501. The UDM 203 select the AUSF that holds the latest KAUSF of the UE 203. If the UDM 203 decided that the UE 300 is to acknowledge the successful security check of the received UE Parameters Update Data, then the UDM 203 shall set the corresponding indication in the UE Parameters Update Data and include the ACK Indication in the UPU Protection service operation message to signal that it also needs the expected UPU-XMAC-IUE. In one embodiment, the inclusion of UE Parameters Update Data in the calculation of UPU-MAC-IAUSF allows the UE 300 to verify that it has not been tampered by any intermediary. The expected UPU-XMAC-IUE allows the UDM 203 to verify that the UE 300 received the UE Parameters Update Data correctly.

At step 940, the UDM 203 shall invoke Notification service operation, which contains UE Parameters Update Data, UPU-MAC-IAUSF, Counter UPU within the Access and Mobility Subscription data. If the UDM 203 requests an acknowledgement, it shall temporarily store the expected UPU-XMAC-IUE.

At step 945, upon receiving the Notification message, the AMF 201 shall send a DL Transport message to the served UE 300. The AMF 201 shall include in the DL Transport message the transparent container received from the UDM 203.

At step 950, on receiving the DL Transport message, the UE 300 shall calculate the UPU-MAC-IAUSF in the same way as the AUSF 202 on the received UE Parameters Update Data and the Counter UPU and verify whether it matches the UPU-MAC-IAUSF value received in the DL Transport message. If the verification of UPU-MAC-IAUSF is successful and the UE 300 stores the received refresh parameter and uses the refresh parameter to refresh the key KAF Key derivation is performed using the key derivation function (KDF).

At step 955, the UDM 203 has requested an acknowledgement from the UE 300 and the UE 300 has successfully verified and updated the UE Parameters Update Data provided by the UDM 203, then the UE 300 sends the UL Transport message to the serving AMF 201. The UE 300 generates the UPU-MAC-IUE and include the generated UPU-MAC-IUE in a transparent container in the UL Transport message.

At step 960, if a transparent container with the UPU-MAC-IUE was received in the UL Transport message, the AMF 201 shall send a Info request message with the transparent container to the UDM 203.

At step 965, if the UDM 203 indicated that the UE 300 is to acknowledge the successful security check of the received UE Parameters Update Data, then the UDM 203 compares the received UPU-MAC-IUE with the expected UPU-XMAC-IUE that the UDM 203 stored temporarily.

At step 970, the UDM 203 sends the AKMA Refresh Response message to the AAnF 204. The message includes at least one of: SUPI, Key Index and AKMARP.

At step 975, on receiving the response from the UDM 203, the AAnF 204 stores the key index and AKMARP along with the AKMA context of the UE 300.

At step 980, the UE 300 sends a new Application session establishment request to the AF 205. The UE 300 generates the A-KID and includes the A-KID in the request message. The A-KID includes the Key Index of the corresponding key KAF to be used for the Authentication and/or authorization and/or establishment of secure interface. A-KID shall be usable as a key identifier in protocols used in the reference point Ua*. AKMA AF shall be able to identify the AAnF serving the UE 300 from the A-KID. A-KID identifies the KAKMA key of the UE 300 and/or the context of the UE 300 and the Key Index included in the A-KID identifies the refreshed key KAF or the refresh parameter to be used to derive the new key KAF. In one embodiment, the A-KID shall be in NAI format as specified in clause 2.2 of IETF RFC 7542, i.e. username@realm. The username part shall include the Routing Identifier, Key Index, other possible parameters and the A-TID (AKMA Temporary UE Identifier), and the realm part shall include Home Network Identifier. A-TID shall be derived from KAUSF as specified in Annex A.3 of TS 33.535.

At step 985, upon receiving the request from the UE 300, if the AF 205 does not have an active context associated with the A-KID, then the AF 205 sends a AKMA Application Key Get request to AAnF 204 with the A-KID to request the key KAF for the UE 300. In one embodiment, the AF 205 also includes its identity (AF_ID) in the request. In one embodiment, the AF_ID consists of the FQDN of the AF 205 and the Ua* security protocol identifier. The latter parameter identifies the security protocol that the AF 205 will use with the UE 300. In one embodiment, the AAnF 204 checks whether the AAnF 204 can provide the service to the AF 205 based on the configured local policy or based on the authorization information or policy provided by the NRF using the AF_ID. If it succeeds, the following procedures are executed. Otherwise, the AAnF 204 shall reject the procedure. In one embodiment, the AAnF 204 derives the AKMA Application Key (KAF) from KAKMA if it does not already have KAF for the key index in the A-KID. The key derivation of KAF is performed as like the UE 300.

At step 990, the AAnF 204 sends AKMA Application Key Get response to the AF 205 with KAF and the KAF expiration time.

At step 995, the AF 205 sends the Application Session Establishment Response to the UE 300. If the information in step 985 indicates failure of AKMA key request, the AF 205 shall reject the Application Session Establishment by including a failure cause.

In an embodiment, if the key index is associates to the initial key (for illustrative purpose all 0's), then a new key is derived and AKMA refresh parameter used as an input is reserved value, for illustrative purpose all 0's. If the key index is associated to refreshed key, then a new key is derived and AKMA refresh parameter associated with the Key index is used as one of the input parameter or stored key associated with the Key index is retrieved.

Figure 10:
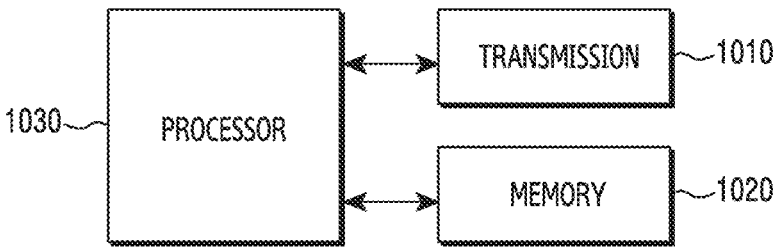
FIG. 10 illustrates a block diagram illustrating a structure of a UE according to an embodiment of the disclosure.

FIG. 10 illustrates a block diagram illustrating a structure of a UE according to an embodiment of the disclosure. FIG. 10 corresponds to the example of the UE of FIG. 3.

As shown in FIG. 10, the UE according to an embodiment may include a transceiver 1010, a memory 1020, and a processor 1030. The transceiver 1010, the memory 1020, and the processor 1030 of the UE may operate according to a communication method of the UE described above. However, the components of the UE are not limited thereto. For example, the UE may include more or fewer components than those described above. In addition, the processor 1030, the transceiver 1010, and the memory 1020 may be implemented as a single chip. Also, the processor 1030 may include at least one processor.

The transceiver 1010 collectively refers to a UE receiver and a UE transmitter, and may transmit/receive a signal to/from a base station or a network entity. The signal transmitted or received to or from the base station or a network entity may include control information and data. The transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the UE. Also, the memory 1020 may store control information or data included in a signal obtained by the UE. The memory 1020 may be a storage medium, such as read-only memory (ROM), random access memory (RAM), a hard disk, a CD-ROM, and a DVD, or a combination of storage media.

The processor 1030 may control a series of processes such that the UE operates as described above. For example, the transceiver 1010 may receive a data signal including a control signal transmitted by the base station or the network entity, and the processor 1030 may determine a result of receiving the control signal and the data signal transmitted by the base station or the network entity.

Figure 11:
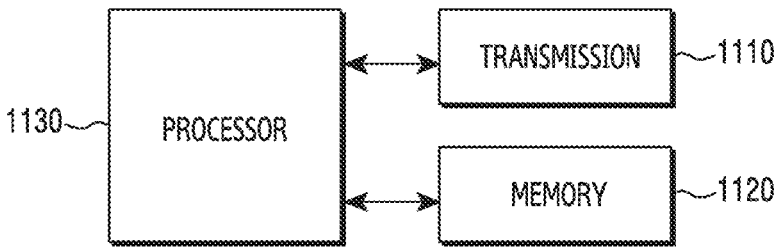
FIG. 11 illustrates a block diagram illustrating a structure of a network entity according to an embodiment of the disclosure, according to the embodiments as disclosed herein.

FIG. 11 illustrates a block diagram illustrating a structure of a network entity according to an embodiment of the disclosure. FIG. 11 corresponds to the example of the network entity of FIG. 2.

As shown in FIG. 11, the network entity according to an embodiment may include a transceiver 1110, a memory 1120, and a processor 1130. The transceiver 1110, the memory 1120, and the processor 1130 of the network entity may operate according to a communication method of the network entity described above. However, the components of the network entity are not limited thereto. For example, the network entity may include more or fewer components than those described above. In addition, the processor 1130, the transceiver 1110, and the memory 1120 may be implemented as a single chip. Also, the processor 1130 may include at least one processor.

The transceiver 1110 collectively refers to a network entity receiver and a network entity transmitter, and may transmit/receive a signal to/from a terminal or a base station. The signal transmitted or received to or from the terminal or a base station may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the network entity. Also, the memory 1120 may store control information or data included in a signal obtained by the network entity. The memory 1120 may be a storage medium, such as read-only memory (ROM), random access memory (RAM), a hard disk, a CD-ROM, and a DVD, or a combination of storage media.

The processor 1130 may control a series of processes such that the network entity operates as described above. For example, the transceiver 1110 may receive a data signal including a control signal transmitted by the terminal, and the processor 1130 may determine a result of receiving the control signal and the data signal transmitted by the terminal.

According to various embodiments, a method performed by a Unified Data Management (UDM) in a wireless network for establishing communication between at least one User Equipment (UE) and at least one Application Function (AF), wherein the method comprises: receiving, a first request from an Authentication and Key Management for Application (AKMA) Anchor Function (AAnF), wherein the first request comprises a AKMA refresh request indication, at least one Subscription Permanent Identifier (SUPI) associated with the at least one User Equipment (UE), at least one Application Function Identity (AF ID), and a key index; generating, a AKMA refresh parameter (AKMARP) based on the received first request; and transmitting the generated AKMA refresh parameter (AKMARP), the at least one SUPI, and the key index to an Authentication Server Function (AUSF) for generating a new AKMA Key Identifier (A-KID).

In one embodiment, wherein the method further comprises: receiving, at least one acknowledgement along with the key index from the AUSF upon generating the new A-KID by the AUSF.

In one embodiment, wherein the method further comprises: transmitting the generated AKMA refresh parameter (AKMARP) along with the key index to the at least one UE through an Access and Mobility Management Function (AMF); and receiving, at least one acknowledgement from the at least one UE through the AMF, wherein the at least one acknowledgement is received upon generating the new A-KID by the at least one UE.

In one embodiment, wherein the generated AKMA refresh parameter (AKMARP) is transmitted to the at least one UE upon receiving the at least one acknowledgement from the AUSF.

In one embodiment, wherein the new A-KID is generated in order to establish communication between the at least one UE and the at least one AF.

According to various embodiments, a method performed by an Authentication Server Function (AUSF) for establishing communication between at least one User Equipment (UE) and at least one Application Function (AF), wherein the method comprises: receiving a first request from a Unified Data Management (UDM), wherein the first request comprises an Authentication and Key Management for Application (AKMA) refresh parameter (AKMARP), at least one Subscription Permanent Identifier (SUPI) associated with the at least one User Equipment (UE), and a key index; generating a new AKMA Key Identifier (A-KID) based on the received first request, wherein the generated new A-KID includes the key index; and transmitting the generated new A-KID to an AKMA Anchor Function (AAnF), wherein the AAnF is associated with the at least one AF.

In one embodiment, wherein the method further comprises: transmitting at least one acknowledgement along with the key index to the UDM upon generating the new A-KID.

In one embodiment, wherein method further comprises: generating at least one new AKMA key (KAKMA) based on the first request received.

In one embodiment, wherein the method further comprises: generating the new KAKMA by inputting at least one of a AUSF Key (KAUSF), AKMA, the AKMARP, and the at least one SUPI to a key derivation function (KDF), generating the new A-KID by generating a new AKMA Temporary Identifier (A-TID), and generating the new A-TID by inputting at least one of the KAUSF, a AKMA Temporary Identifier (A-TID), the AKMARP, the at least one SUPI, and the key index to the KDF.

According to various embodiments, a method performed by a User Equipment (UE) for establishing communication between a User Equipment (UE) and at least one Application Function (AF), wherein the method comprises: receiving a first request from a Unified Data Management (UDM), wherein the first request comprises an Authentication and Key Management for Application (AKMA) refresh parameter (AKMARP), and a key index; generating a new AKMA Key Identifier (A-KID) based on the received first request, wherein the generated new A-KID includes the key index; transmitting a second request based on the generated new A-KID to the at least one AF, wherein the second request is an application session establishment request for establishing the communication between the UE and the at least one AF; and receiving an application session establishment response message including a success message and a reject message from the at least one AF based on the second request transmitted.

In one embodiment, wherein the method further comprises: retrieving a latest Application Function key (KAF) and corresponding key index available at the UE when an existing session between the UE and the at least one AF is disconnected; transmitting an application session establishment request including the corresponding key index for re-establishing the communication between the UE and the at least one AF; and receiving an application session establishment response message including a success message and a reject message from the at least one AF based on the application session establishment request transmitted.

In one embodiment, wherein the method further comprises: transmitting at least one acknowledgement to the UDM in response to generating the new A-KID.

In one embodiment, wherein receiving the application session establishment response message and the reject message from the at least one AF based on the second request transmitted comprises: receiving the success message when the key index corresponds to a new A-KID available at the at least one AF; and receiving the reject message when the key index does not correspond to the new A-KID available at the at least one AF.

In one embodiment, wherein the first request is received by the UE from the UDM through an Access and Mobility Management Function (AMF).

According to various embodiments, a method performed by an Application Function (AF) for establishing communication between at least one User Equipment (UE) and an Application Function (AF), wherein the method comprises: receiving a first request from the at least one UE, wherein the first request is an application session establishment request including an Authentication and Key Management for Application (AKMA) Key Identifier (A-KID) for establishing the communication between the at least one UE and the AF; determining whether a key index included the A-KID corresponds to a new Application Function key (KAF) available in an Authentication and Key Management for Application (AKMA) Anchor Function (AAnF) associated with the AF; and performing one of: transmitting an application session establishment response message including a success message in response to the determination that the key index corresponds to the new KAF; and transmitting an application session establishment response message including a reject message in response to the determination that the key index does not correspond to the new KAF.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a unified data management (UDM) entity, in a mobile communication system, the method comprising:

receiving, from an authentication and key management for application (AKMA) anchor function (AAnF) entity, a first request message including a AKMA refresh indication and a key index;

triggering a AKMA key refresh procedure, based on the first request message; and transmitting, to an authentication server function (AUSF) entity, a second request message including the AKMA refresh indication, wherein the key index is used to identify a refreshed key, and wherein the key index is monotonically incremented for each additional calculation of an application function (AF) key from the refreshed key.

2. The method of claim 1, wherein a AKMA key and a AKMA key identifier (A-KID) is generated based on the second request message, and wherein one of bits in the A-KID includes the key index.

3. The method of claim 2, wherein the AKMA key and the A-KID are transmitted to the AAnf entity.

4. The method of claim 2, further comprising:

receiving, from the AUSF entity, a first response message including at least one of a message authentication code integrity (MAC-I) parameter, a counter, the A-KID, the key index, or an AKMA refresh parameter (AKMARP), wherein the MAC-I parameter and the counter are used to secure a refresh parameter.

5. The method of claim 4, further comprising:

providing, to a user equipment (UE) via an access and mobility management function (AMF) entity, AKMA key refresh data, wherein the AKMA key refresh data includes at least one of the AKMARP, whether the UE need to send an acknowledgement (ACK) to the UDM entity, the key index, the MAC-I parameter, or counter.

6. The method of claim 5, wherein an application session between the UE and at least one AF entity is established based on the AKMA key refresh data.

7. A method performed by an authentication server function (AUSF) entity, in a mobile communication system, the method comprising:

receiving, from a unified data management (UDM) entity, a request message including an Authentication and Key Management for Application (AKMA) refresh indication;

generating a AKMA key and a AKMA key identifier (A-KID) based on the request message; and transmitting, to the UDM entity, a response message including at least one of a message authentication code integrity (MAC-I) parameter, a counter, the A-KID, a key index, or an AKMA refresh parameter (AKMARP), wherein the key index is used to identify a refreshed key, and wherein the key index is monotonically incremented for each additional calculation of an application function (AF) key from the refreshed key.

8. The method of claim 7, wherein one of bits in the A-KID includes the key index.

9. The method of claim 7, further comprising:

transmitting, to an AKMA anchor function (AAnF) entity, the AKMA key and the A-KID.

10. A unified data management (UDM) entity, in a mobile communication system, the UDM entity comprising:

a transceiver; and a controller couple with the transceiver, and configured to:

receive, from an authentication and key management for application (AKMA) anchor function (AAnF) entity, a first request message including a AKMA refresh indication and a key index, trigger a AKMA key refresh procedure, based on the first request message, and transmit, to an authentication server function (AUSF) entity, a second request message including the AKMA refresh indication, wherein the key index is used to identify a refreshed key, and wherein the key index is monotonically incremented for each additional calculation of an application function (AF) key from the refreshed key.

11. The UDM entity of claim 10, wherein a AKMA key and a AKMA key identifier (A-KID) is generated based on the second request message, and wherein one of bits in the A-KID includes the key index.

12. The UDM entity of claim 11, wherein the AKMA key and the A-KID are transmitted to the AAnf entity.

13. The UDM entity of claim 11, wherein the controller is further configured to:

receive, from the AUSF entity, a first response message including at least one of a message authentication code integrity (MAC-I) parameter, a counter, the A-KID, the key index, or an AKMA refresh parameter (AKMARP), wherein the MAC-I parameter and the counter are used to secure a refresh parameter.

14. The UDM entity of claim 13, wherein the controller is further configured to:

providing, to a user equipment (UE) via an access and mobility management function (AMF) entity, AKMA key refresh data, wherein the AKMA key refresh data includes at least one of the AKMARP, whether the UE need to send an acknowledgement (ACK) to the UDM entity, the key index, the MAC-I parameter, or counter.

15. The UDM entity of claim 14, wherein an application session between the UE and at least one AF entity is established based on the AKMA key refresh data.

16. An authentication server function (AUSF) entity, in a mobile communication system, the AUSF entity comprising:

a transceiver; and a controller couple with the transceiver, and configured to:

receive, from a unified data management (UDM) entity, a request message including an Authentication and Key Management for Application (AKMA) refresh indication, generate a AKMA key and a AKMA key identifier (A-KID) based on the request message, and transmit, to the UDM entity, a response message including at least one of a message authentication code integrity (MAC-I) parameter, a counter, the A-KID, a key index, or an AKMA refresh parameter (AKMARP), wherein the key index is used to identify a refreshed key, and wherein the key index is monotonically incremented for each additional calculation of an application function (AF) key from the refreshed key.

17. The AUSF entity of claim 16, wherein one of bits in the A-KID includes the key index.

18. The AUSF entity of claim 16, wherein the controller is further configured to:

transmit, to an AKMA anchor function (AAnF) entity, the AKMA key and the A-KID.

* * * * *